(12) United States Patent
McGee et al.

(10) Patent No.: US 12,282,662 B2
(45) Date of Patent: Apr. 22, 2025

(54) CHASSIS SERVICING AND MIGRATION IN A SCALE-UP NUMA SYSTEM

(71) Applicant: Hewlett Packard Enterprise Development LP, Houston, TX (US)

(72) Inventors: Thomas Edward McGee, Eau Claire, WI (US); Brian J. Johnson, Rosemount, MN (US); Frank R. Dropps, Annandale, MN (US); Derek S. Schumacher, Naperville, IL (US); Stuart C. Haden, Lucas, TX (US); Michael S. Woodacre, Winchester (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 266 days.

(21) Appl. No.: 17/898,189

(22) Filed: Aug. 29, 2022

(65) Prior Publication Data

US 2024/0069742 A1    Feb. 29, 2024

(51) Int. Cl.
*G06F 3/06* (2006.01)
*G06F 12/0817* (2016.01)

(52) U.S. Cl.
CPC .......... *G06F 3/0617* (2013.01); *G06F 3/0647* (2013.01); *G06F 3/0679* (2013.01); *G06F 12/0828* (2013.01); *G06F 2212/271* (2013.01); *G06F 2212/621* (2013.01)

(58) Field of Classification Search
CPC .... G06F 3/0617; G06F 3/0647; G06F 3/0679; G06F 12/0828; G06F 2212/271; G06F 221/621
See application file for complete search history.

(56) References Cited

U.S. PATENT DOCUMENTS

| 7,039,827 | B2 | 5/2006 | Meyer et al. | |
|---|---|---|---|---|
| 7,877,358 | B2 | 1/2011 | Ritz et al. | |
| 9,852,033 | B2 | 12/2017 | Southern et al. | |
| 10,061,534 | B2 | 8/2018 | Gupta et al. | |
| 11,050,620 | B2 | 6/2021 | Reed et al. | |
| 2009/0319604 | A1* | 12/2009 | Hatasaki | G06F 3/0607 710/52 |
| 2013/0124801 | A1* | 5/2013 | Natrajan | G06F 12/0868 711/126 |
| 2017/0220474 | A1* | 8/2017 | Dice | G06F 16/1767 |
| 2020/0379805 | A1* | 12/2020 | Porter | G06F 9/5072 |

* cited by examiner

*Primary Examiner* — Baboucarr Faal
(74) *Attorney, Agent, or Firm* — Yao Legal Services, Inc.

(57) ABSTRACT

One aspect of the application can provide a system and method for replacing a failing node with a spare node in a non-uniform memory access (NUMA) system. During operation, in response to determining that a node-migration condition is met, the system can initialize a node controller of the spare node such that accesses to a memory local to the spare node are to be processed by the node controller, quiesce the failing node and the spare node to allow state information of processors on the failing node to be migrated to processors on the spare node, and subsequent to unquiescing the failing node and the spare node, migrate data from the failing node to the spare node while maintaining cache coherence in the NUMA system and while the NUMA system remains in operation, thereby facilitating continuous execution of processes previously executed on the failing node.

18 Claims, 17 Drawing Sheets

CHASSIS SERVICING AND MIGRATION IN A SCALE-UP NUMA SYSTEM

BACKGROUND

This disclosure is generally related to processor state and data migration while replacing a soon to-be-failed non-uniform memory access (NUMA) node.

BRIEF DESCRIPTION OF THE FIGURES

In the figures, like reference numerals refer to the same figure elements.

DETAILED DESCRIPTION

Figure 1:
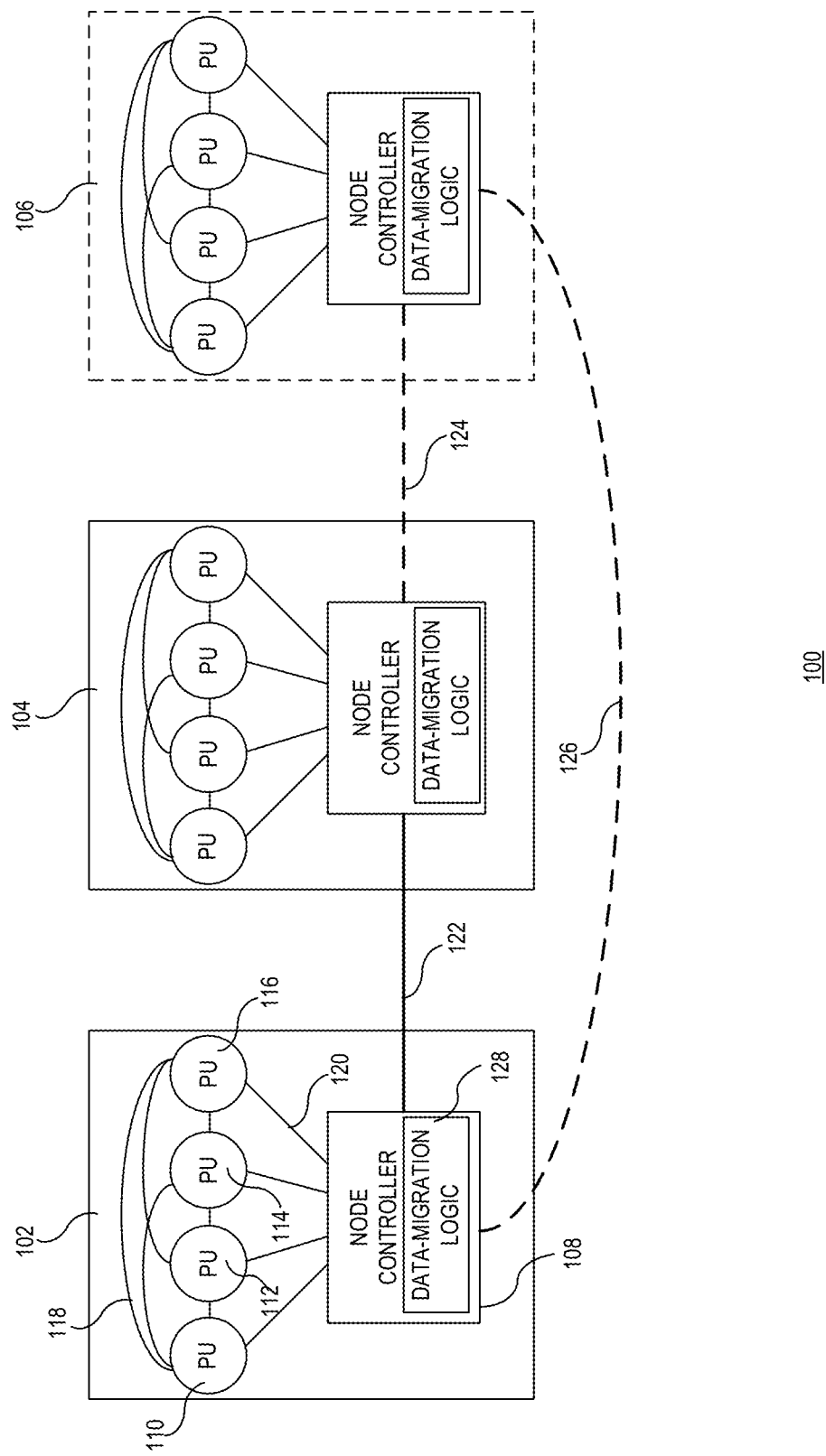
FIG. 1 presents an exemplary non-uniform memory access (NUMA) system, according to one aspect.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

As the size of computer systems increases, the likelihood of component failure also increases. A failed component can negatively affect the availability of a computer system. Certain types of component failure (e.g., a failed memory chip) may only cause performance degradation, while other types of component failure (e.g., a failed processor) may cause the entire system to fail. Various mechanisms can be used to monitor the status of the computer system and use analytics to predict the imminent failure of a component. It is desirable to replace the to-be-failed component with a redundant component while the system is running, before the component actually fails, thus preventing performance degradation or system failure.

Today's operating systems, such as Linux, have the ability to add or remove memory modules while the system is running by providing standby memory modules. When needed (e.g., when memory failure is expected), the standby memory modules can be activated to replace the failing memory module. With memory virtualization, data stored in the failing memory can be migrated to the newly activated memory. For example, data can be read from a physical address of the failing memory and then written to a corresponding physical address of the newly activated memory while the virtual address mapping is updated. However, this solution only works for failures in a memory module or a memory controller but does not resolve non-memory failures, such as node failure in a computer cluster.

In non-uniform memory access (NUMA) systems, a cluster of microprocessors in a multi-processor system can share resources such as memory, which improves system performance and expand the ability of the system. Each node in the NUMA system contains processors and memory. An advanced memory controller (also referred to as a node controller) allows a node to use memory on all other nodes. When a processor accesses memory that does not reside within its own node (also referred to as remote memory), data can be transferred over the NUMA connection.

Managing hardware failures in NUMA systems is different from managing failures in computer clusters not implementing NUMA technologies. More specifically, a computer cluster can manage failures in individual nodes by shutting down the failed node and reissuing failed jobs to other remaining nodes. Because each node is a fully contained computer system running its own copy of the operating system, there is no need to migrate processes. Instead, jobs and processes can be restarted from the beginning or from an intermediate checkpoint. In contrast, in a NUMA system, the multiple processors work under a single operating system and access each other's memory. When a to-be-failed node is replaced with a spare node, maintaining cache coherence of data stored on different nodes can be challenging.

Note that there are hypervisor-based solutions that can combine small, independent computers into a larger virtual NUMA system. These solutions can add and remove nodes for the purpose of properly provisioning the system to perform a compute task. However, in the virtual NUMA system, the resources (including both processors and memory) are allocated for virtual machines. The resources are not added or removed in order to dynamically address an imminent hardware failure. It is desirable to provide a solution to the problem of managing arbitrary hardware failure within NUMA systems, especially in scale-up NUMA systems, where each node includes a larger number of processors and correspondingly larger memory.

According to some aspects of the instant application, a scale-up NUMA system can include a standby or spare node that can be activated when imminent failure is detected on a running node. Processor states and data of the failing node can be migrated to the spare node while both nodes are running. More specifically, the migration can be an "in place" migration, meaning that the spare node becomes an identical replacement of the failing node in the address map, making the migration transparent to the operating system. The migration can be hardware-assisted with migration hardware features being added to each node controller. Depending on the cache-coherence tracking scheme implemented by the node controllers and processors, the migration process can be handled differently in order to maintain cache coherence. If the processors and the node controllers have a full directory of the memory, a new "ForwardPending" directory state is introduced to indicate whether the migration is completed for each cache line. Note that a cache line is a unit of data being transferred between memory and cache and can also be referred to as a cache block. When a cache line is copied from the memory into the cache, a cache entry is created. If the processor and the node controller have a partial directory, different mechanisms can be used to prevent cache lines in the local memory of the spare node from being accessed prior to migration. For example, the local memory of the spare node can be poisoned to force an exception. Alternatively, processors on the spare node can be made aware of the ongoing migration and can default the node controller as the owner of any cache line not being tracked in the directory. The key is to make sure that any request to the local memory of the spare node will be first managed by the node controller, which tracks the migration status of each cache line. With the proposed in-place migration, the entire system is only quiesced briefly to migrate the processor states, and migration of the data does not affect the system operation. The system downtime is much shorter than what is needed to restart the system.

FIG. 1 presents an exemplary NUMA system, according to one aspect. NUMA system 100 can include multiple active nodes (e.g., nodes 102 and 104) and at least a spare node (e.g., node 106). During normal operations, the active nodes can perform compute tasks (e.g., running applications), whereas spare node 106 can be in a standby mode (e.g., it may be partially initialized or powered down). The structure of each node can be similar, with each node including a node controller and a plurality of processing units (or processors) coupled to the node controller. The different processors and node controllers can also have similar hardware/software features and are capable of performing similar functions. For example, active node 102 can include a node controller 108 and processing units 110-116. In this disclosure, the terms "processing unit" and "processor" are interchangeable. Moreover, because a processor is attached to a printed circuit board (PCB) via a socket, a multi-processor system can also be referred to as a multi-socket system.

The processing units and node controller within each node can be coupled to each other via intra-node links (e.g., links 118 and 120). The intra-node link between two processing units can allow one processing unit to access memory (not shown in FIG. 1) attached to other processing units. For a certain processing unit, its own attached memory and memory attached to other processing units within the same node are considered local memory. Different node controllers can be coupled to each other via inter-node links (or NUMA links) (e.g., links 122, 124, and 126). As discussed previously, processing units can access remote memory (i.e., memory attached to processing units in other nodes) via the inter-node links. In FIG. 1, inter-node links 124 and 126 are represented using dashed lines, indicating these links are currently inactive, because spare node 106 is currently inactive.

According to some aspects, when imminent failure on one of the active nodes is detected, spare node 106 can be activated, and the previously inactive inter-node links can also be activated. For example, if imminent failure is detected on node 102, inter-node links 124 and 126 will be activated. Activated inter-node link 126 can allow processor states and data stored in the memory of node 102 to be migrated from failing node 102 to spare node 106, making spare node 106 an identical replacement of failing node 102. Once the migration of the processor states and data is completed, failing node 102 and its coupled inter-node links can be powered down. To reduce the amount of system downtime, both failing node 102 and spare node 106 can be running during data migration. Hence, it is possible that processors on both nodes access and modify the same data. In addition, other active nodes in the system (e.g., node 104) may also access and modify the same data while the data is being migrated from failing node 102 to spare node 106. Maintaining data coherence can be important to ensure that the system functions correctly during and after the data migration. According to some aspects, each node controller can include a data-migration logic that can interact with other logic units (e.g., a directory logic or other types of logic participating in the node-migration operations) on the node controller to ensure data coherence during node migration. In the example shown in FIG. 1, node controller 108 can include a data-migration logic 128.

The following discussions regarding the data migration process can reference the system diagram shown in FIG. 1. Note that, although FIG. 1 shows a 12-socket, 3-node-controller system, in practice, a NUMA system can include any reasonable number of nodes, and each node can include any reasonable number of processing units. According to some aspects, each node (including the node controller and the processing units) can be enclosed in one chassis, and the system shown in FIG. 1 can also be referred to as a three-chassis system. The act of replacing or servicing a failing node can also be referred to as replacing or servicing a failing chassis.

Figure 2:
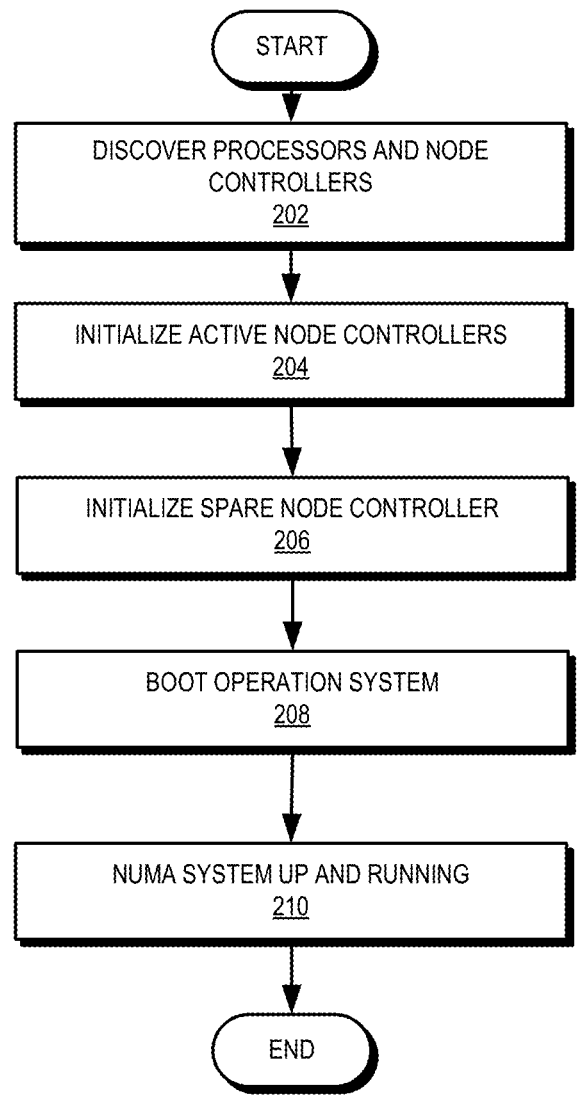
FIG. 2 presents a flowchart illustrating an exemplary system-initialization process, according to one aspect.

Before being put into service, the NUMA system (including the active nodes and optionally the spare node) needs to be initialized. FIG. 2 presents a flowchart illustrating an exemplary system-initialization process, according to one aspect. During initialization, the system-boot firmware can discover all processing units (or processors) and node controllers, including the processors and node controller on the spare node (operation 202). The system-boot firmware can initialize the node controllers of the active nodes (also referred to as active node controllers) to create a NUMA system having a corresponding number of processors (operation 204). Using the system shown in FIG. 1 as an example, the system-boot firmware can initialize the node controllers on nodes 102 and 104 to create an 8-processor or 8-socket NUMA system. Note that initializing a node controller can include setting up the address table (which indicates the memory range of each processor) and the routing table for remote memory access.

The system-boot firmware can also initialize the node controller of the spare node (referred to as the spare node controller) (operation 206). Various parameters of this spare node controller can be configured to match the 8-processor system formed by the two active nodes. The system-boot firmware can subsequently boot the operating system for processors on the active nodes (operation 208). Using the system shown in FIG. 1 as an example, the system-boot firmware can boot the operating system for the 8-processor system including nodes 102 and 104. After booting, the NUMA system can be up and running (operation 210), and the spare node can be left partially initialized or powered down. Similarly, the inter-node links connected to the spare node can be powered down or disabled.

When the NUMA system is operating normally (i.e., no fault is expected), the spare node remains inactive (either partially initialized or powered down). A hardware-based redirect table (which can be used to redirect remote memory accesses from the failing node to the spare node) is not initialized, because there is no knowledge of which node may be failing. Similarly, on the spare node, the processor source address decoders (SADs) are currently unknown because they will differ depending on which active node would be replaced by the spare node.

Depending on the implementation of cache coherence mechanisms/protocols, the initialization of the spare node may be slightly different. According to some aspects, the system can implement directory-based cache-coherence protocols, where a directory is used to track of the status of cache lines in the local memory. In certain situations, the processors and node controller both have a full directory that can individually track the directory state of every cache line in the local memory. In different situations, the processors and node controller both have a partial directory that only tracks the state of the cache lines they own. In the partial-directory situation, only a subset of cache lines in the local memory can have a state other than "INVALID." If the partial-directory approach is implemented, there can be two solutions to maintain cache coherence during data migration. If a first solution is chosen, all local memory can be poisoned during system initialization, meaning that the memory is marked as bad or corrupted. The purpose is to cause an exception when a cache line is referenced prior to being properly migrated. If a second solution is chosen, the processors can be made aware of a migration taking place and default the node controller as the owner of any cache line not found in its directory.

Once the NUMA system detects that an active node is about to fail (but not yet failed), a platform-management system can be activated. Various known mechanisms can be used to detect imminent failure, and the actual failure-detection mechanism implemented by the system used is not limited by the scope of this disclosure. According to some aspects, the platform-management system can be implemented as firmware embedded in the baseboard management controller (BMC) of the NUMA system. Subsequent operations on the spare node as well as the active nodes can be managed and controlled by the platform-management system. For example, once activated, the platform-management system can enable the spare node, which can involve powering up the spare node if needed, notifying the spare node of the identity of the failing node, finalizing the initialization of the spare node, etc.

Figure 3A:
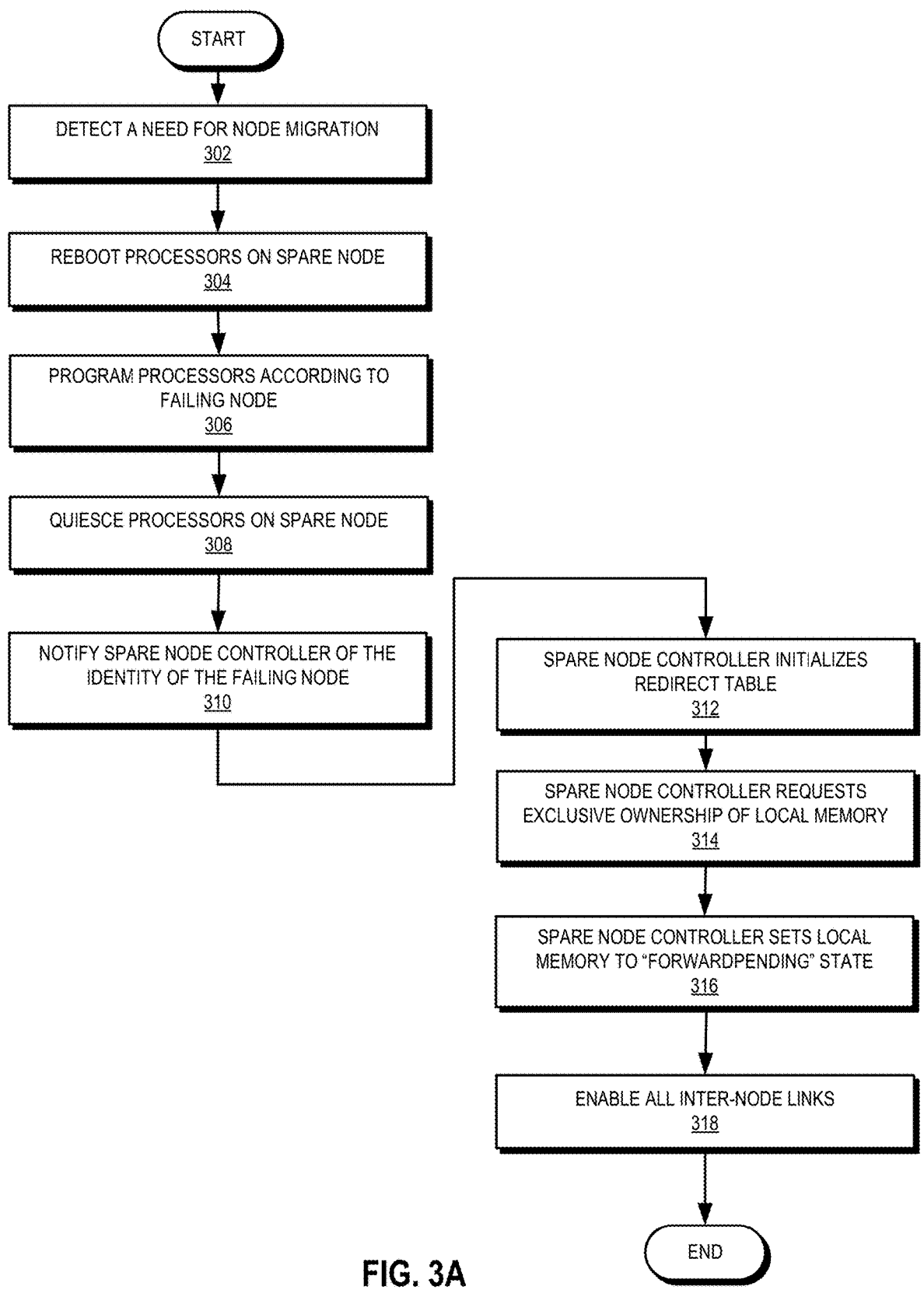
FIG. 3A presents a flowchart illustrating an exemplary process for activating a spare node, according to one aspect.

FIG. 3A presents a flowchart illustrating an exemplary process for activating a spare node, according to one aspect. In this example, the processors and node controller of each node have full-directory knowledge of the cache lines in the local memory. During operation, the system detects a need for node migration and activates the platform-management system (operation 302). As discussed previously, when imminent failure is detected on one of the active nodes, processor states and data on the failing node can be migrated to the spare node, such that the spare node can become an identical copy of the failing node to replace the failing node. The platform-management system can subsequently reboot the processors on the spare node (operation 304) and program/initialize the processors according to the failing node (operation 306). For example, the processors on the spare node can be programmed to have various parameters (e.g., SAD entries, advanced programmable interrupt controller (APIC) IDs, etc.) that match (or are copies of) those of the failing node. This operation finalizes the initialization of the spare node. If the spare node was previously powered down, the platform-management system can power up the spare node before initializing the processors on the spare node.

Subsequently, the spare node processors are quiesced (operation 308). Quiescing the processors can prevent executions on the core or I/O traffic, thus preventing changes made to data stored in the local memory. The platform-management system can notify the spare node controller (i.e., the node controller of the spare node) of the identity of the failing node (operation 310). In response to obtaining the identity of the failing node, the spare node controller can initialize the redirect table (operation 312). More specifically, the redirect table can indicate that the remaining active nodes (i.e., active nodes other than the failing node) and the spare node are the memory homes. The spare node controller can then request exclusive ownership of all local memory of the spare node (operation 314). For example, the spare node controller can issue "exclusive read" to cache lines in the local memory, one line at a time. Alternatively, some systems can include a special feature that can set the processor directory for all cache lines at once. Granting the spare node controller exclusive ownership of the cache lines can ensure that the local processors (i.e., the processors on the spare node) would send all their initial memory-access requests to the spare node controller, thus allowing the spare node controller to get the actual data from the failing node.

In the full-directory situation where the processors and node controller both have knowledge of all cache lines in the system, a new directory state can be added to facilitate the data migration. This new state can be referred to as a "ForwardPending" state, which can be represented by an additional bit in the directory and can be used to indicate to the node controller that the cache line has not been migrated yet. Before the migration, the spare node controller can initialize the directory state of all of the local memory to the "Forward Pending" state (operation 316). The platform-management system can then enable all inter-node links, including the links between the spare node and all other nodes (operation 318). At this point, the spare node is fully activated and ready to receive processor states and data from the failing node.

Figure 3B:
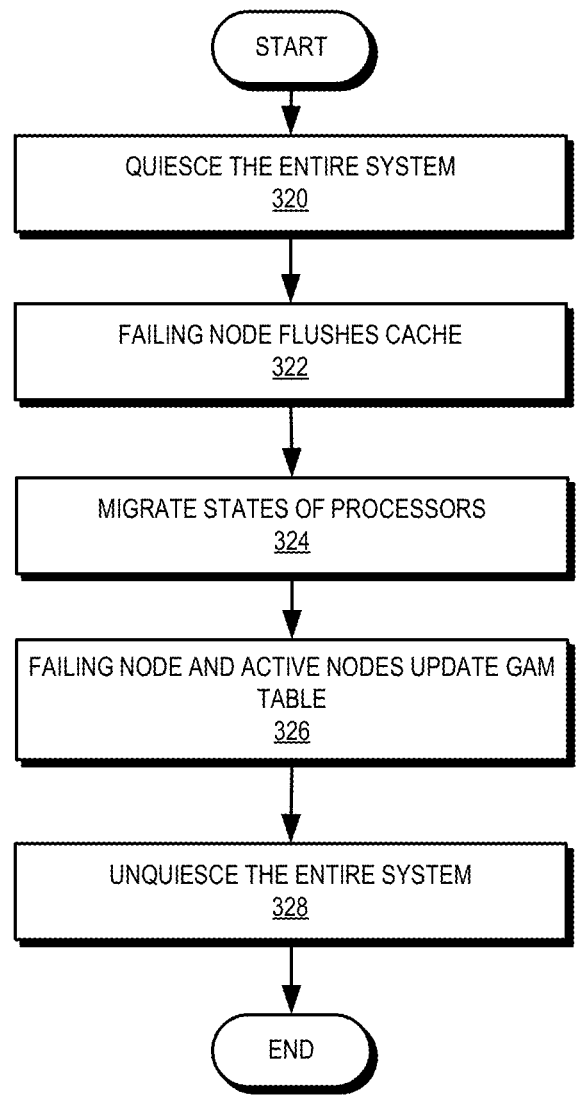
FIG. 3B presents a flowchart illustrating an exemplary process for migrating the states of the processors, according to one aspect.

Before data in the memory can be migrated from the failing node to the spare node, the processor states should be migrated first. FIG. 3B presents a flowchart illustrating an exemplary process for migrating the states of the processors, according to one aspect. Before migrating the states of the processors from the failing node to the spare node, the entire system is quiesced (operation 320). Quiescing the entire system, including the failing node, the remaining active nodes, and the spare node, can prevent the processors' states from becoming inconsistent during migration. Once the system is quiesced, the failing node flushes its cache (operation 322). In other words, the failing node can write back the content in its cache to its corresponding memory locations. Because the failing node may be caching modified data from other active nodes, flushing the failing node's cache can prevent future cache snoops from being sent to the failing node; instead, all future cache snoops would go to the spare node. Subsequently, the state of each processor on the failing node can be migrated (i.e., copied) to each corresponding processor on the spare node (operation 324). Migrating the state from one processor to another allows the other processor to continuously execute a process previously executed on the original processor, without the need to reboot one or both processors. After the state migration, the failing node and the remaining active nodes can each update their global address mapping (GAM) table to indicate that the spare node is the new home of the migrated memory (operation 326). This way, when an active node writes a cache line previously cached for the failing node back to the memory, the cache line will be written back to the memory of the spare node, instead of the failing node. The system is then unquiesced (operation 328).

As can be seen from FIG. 3B, quiescing the entire system allows for the migration of the states of the processors. When quiesced, the system is not available. However, this system downtime is significantly less than the time needed to reboot the system. The system quiesce-unquiesce process shown in FIG. 3B typically may take a few microseconds, whereas rebooting the system may take at least a few minutes to complete.

The processors on the spare node now become exact copies of the processors on the failing node and can continue to execute processes that were executing on the failing node right before the system quiescing. However, the cache and local memory on the spare node are currently empty, and data needs to be migrated from the failing node to the spare node. Because the NUMA system has a shared memory and a single operating system, cache coherence needs to be maintained during data migration. According to some aspects, data can be migrated from the failing node to the spare node during normal operations of the NUMA system. In other words, memory data can be migrated from the failing node to the spare node while the spare node is executing processes (e.g., processes that were originally executed on the failing node).

Figure 3C:
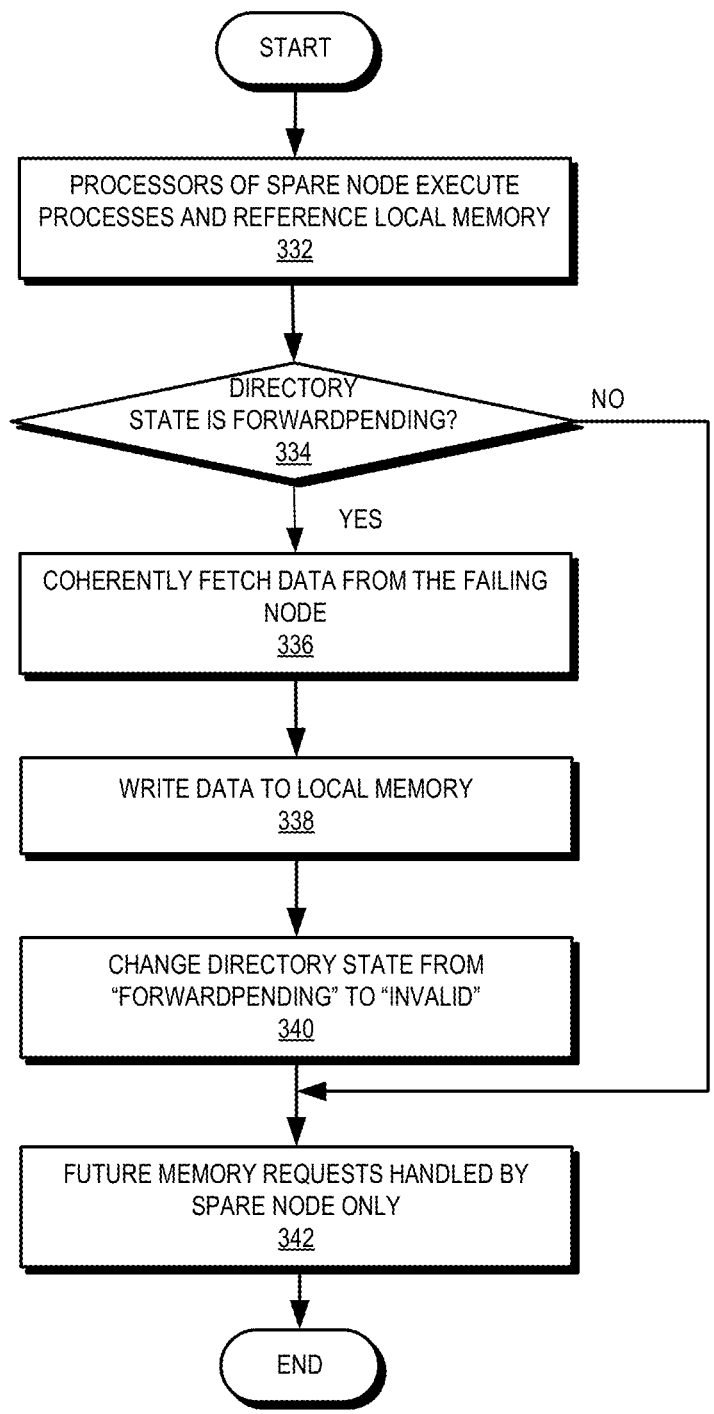
FIG. 3C presents a flowchart illustrating an exemplary process for in-service data migration, according to one aspect.

FIG. 3C presents a flowchart illustrating an exemplary process for in-service data migration, according to one aspect. When a spare node processor executes processes that reference (e.g., read or write) a local cache line, the processor checks the directory state of the local cache line, which shows that the spare node controller is the exclusive owner of the cache line (operation 332). The cache line will then be snooped/read by the spare node controller. The spare node controller checks its directory to determine whether the directory state is "ForwardPending" (operation 334). If so, the spare node controller can coherently fetch (e.g., issue a read request for) the corresponding data from the failing node (operation 336) and write the data to the local memory of the spare node (operation 338). Note that, when the spare node controller fetches the data from the failing node, if a different active node happens to own the corresponding cache line (e.g., data in the failing node's memory is outdated), the cache of the different active node will get snooped/read and the response sent back to the failing node, which will in turn send the response to the spare node.

Upon receiving the data, the directory state of the corresponding cache line in the spare node controller will be changed from "ForwardPending" to "INVALID" (operation 340). Changing the "ForwardPending" state to the "INVALID" state returns the control of the cache line to the processor, which can later fetch the content from the local memory into the cache. Future requests to the same memory address will now be managed by the spare node only (operation 342). At this point, the failing node is out of the loop for this memory address, because data at this memory address has been properly migrated to the spare node. If in operation 334, the directory state is not "Forward Pending," the spare node controller will manage the request as a normal request (operation 342).

Figure 3D:
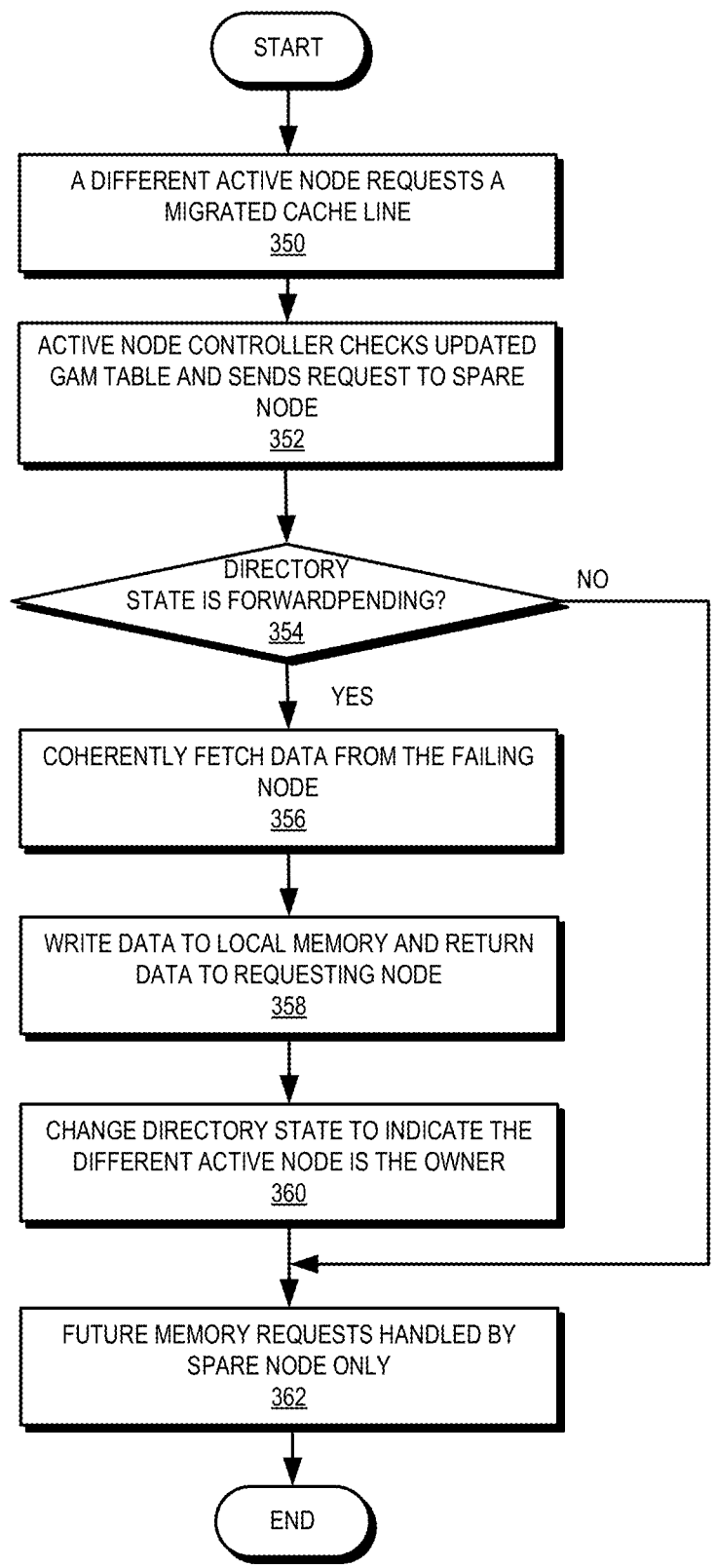
FIG. 3D presents a flowchart illustrating an exemplary process for in-service data migration, according to one aspect.

The process shown in FIG. 3C demonstrates the scenario where data migration is responsive to execution of processes by migrated processors. Data migration may also be triggered by a different active node requesting a migrated cache line. FIG. 3D presents a flowchart illustrating another exemplary process for in-service data migration, according to one aspect. During operation, a different active node may request a migrated cache line (i.e., a cache line in the failing node) (operation 350). The node controller of the active node checks its updated GAM table and sends the request to the spare node controller (operation 352). The spare node controller checks its directory to determine whether the directory state for that cache line is "ForwardPending" (operation 354). If so, the spare node controller can coherently fetch the corresponding data from the failing node (operation 356), write the data to the local memory of the spare node and return the data to the requesting node (operation 358). Like the previous example, if the corresponding cache line happens to be owned by a different active node, the cache of the different active node will get snooped/read and the response sent back to the failing node, which will in turn send the response to the spare node controller.

Upon receiving the data, the directory state of the corresponding cache line in the spare node controller will be changed from "ForwardPending" to indicate that the requesting active node is the owner of the cache line (operation 360). Future requests to the same memory address will now be managed by the spare node only (operation 362). At this point, the failing node is out of the loop for this memory address, because data at this memory address has been properly migrated. If in operation 354, the directory state is not "ForwardPending," the spare node controller will manage the request as a normal request (operation 362).

In the examples shown in FIGS. 3C-3D, data migration is performed on-demand, meaning that data is migrated from the failing node to the spare node when it is requested either by local processors (i.e., processors on the spare node) or by remote processors (i.e., processors on other active nodes). In practice, another process can operate concurrently with the processes shown in FIGS. 3C-3D to migrate memory data from the failing node to the spare node, even through the data is not yet requested. Note that this process does not interfere with the normal operations of the NUMA system.

Figure 3E:
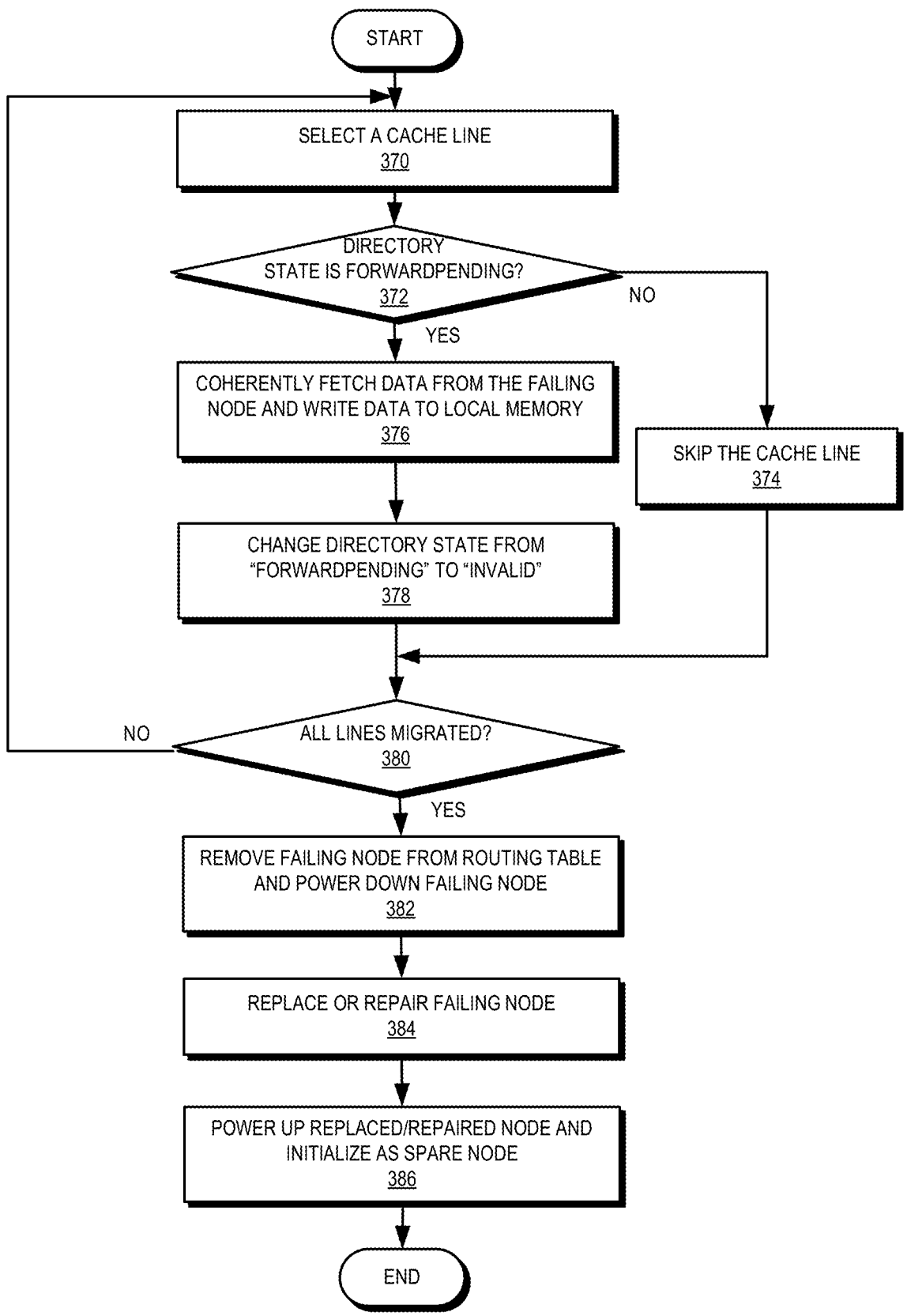
FIG. 3E presents a flowchart illustrating an exemplary process for in-service data migration, according to one aspect.

FIG. 3E presents a flowchart illustrating an exemplary process for in-service data migration, according to one aspect. During operation, a block-transfer engine residing on the spare node controller can step through all cache lines in the local memory by selecting a cache line (operation 370) and determining whether the selected cache line has a directory state of "ForwardPending" (operation 372). The block-transfer engine can step through the memory addresses according to a predetermined order (e.g., ascending or descending). If the directory state is not "ForwardPending," the block-transfer engine can skip the cache line (operation 374). If so, the spare node controller can coherently fetch the corresponding data from the failing node and write the data to the local memory of the spare node (operation 376). Upon receiving the data, the directory state of the corresponding cache line in the spare node controller will be changed from "ForwardPending" to "INVALID" (operation 378). At this point, the failing node is out of the loop for the particular address. Note that, if there is a conflict for the memory address because data in the address is being migrated by a process shown in FIG. 3C or 3D, the block-transfer engine can skip the address and move to the next address.

The block-transfer engine can determine whether all cache lines with the "ForwardPending" state have been properly migrated (operation 380). If not, it moves to the next cache line (operation 370). If all cache lines have been properly migrated (either by the block-transfer engine or through the processes shown in FIGS. 3C and 3D), the failing node can be removed from all routing tables and powered down (operation 382). The failing node can be replaced or repaired (operation 384), and the replaced or repaired node can be powered on and partially initialized as the next spare node (operation 386).

In the examples shown in FIGS. 3C-3E, it is assumed that the processors and node controller on each node have the full directory of the local memory. It is also possible that the processors and node controller only have a partial directory and cannot track the directory state of each and every cache line. In such a situation, introducing the additional "ForwardPending" directory state would not work, and different data-migration solutions may be needed. In one solution, during the initialization of the spare node, the local memory of the spare node can be marked as "poisoned," thus causing an exception if the memory address is referenced by processors prior to the cache line being properly migrated. The exception can trigger an exception handler (which can be implemented as low-level firmware) residing on a remaining active node, which can then notify the spare node controller of the failed address to allow the spare node controller to start proper data migration at the failed address. Note that, if the spare node is powered down while on standby, the poisoning of the local memory can occur when the spare node is activated in response to imminent failure on one of the active nodes. More specifically, the local memory can be marked as poisoned when the processors on the spare node are getting rebooted. The path to the exception handler can be specified when the inter-node links between the spare node and other nodes are activated.

Figure 4A:
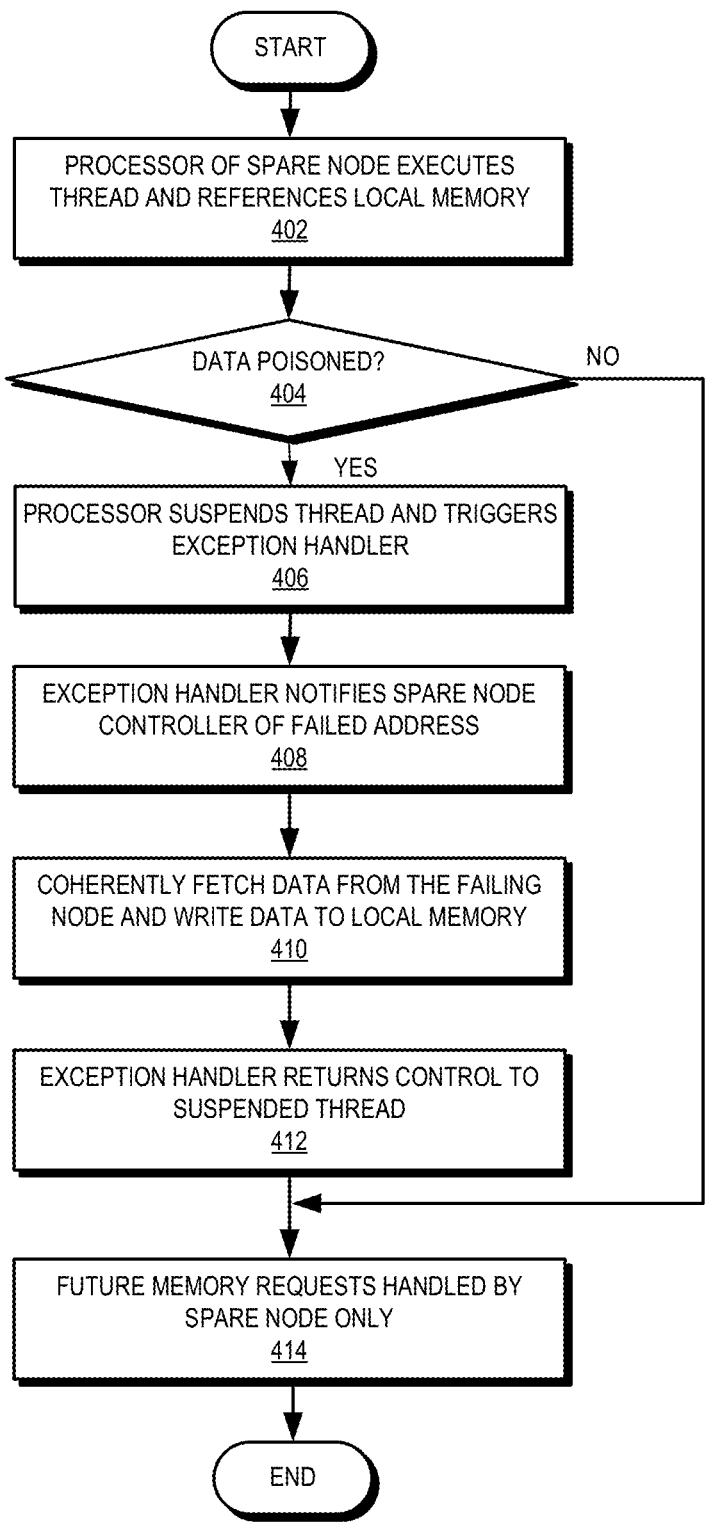
FIG. 4A presents a flowchart illustrating an exemplary process for in-service data migration, according to one aspect.

Without the additional "ForwardPending" directory state (which explicitly indicates the migration status of a cache line), the spare node controller may need to use a different mechanism to facilitate proper data migration. More specifically, the "poisoned" or "non-poisoned" state of a cache line can be used to indicate whether the cache line has been migrated. FIG. 4A presents a flowchart illustrating an exemplary process for in-service data migration, according to one aspect. This process occurs after the spare node has been activated and the processor states have been migrated from the failing node to the spare node. Note that, during activation, the spare node controller no longer needs to request ownership of local memory and there is no "ForwardPending" state in the directory. During operation, a spare node processor executes a thread that references a local cache line (operation 402), and the processor determines whether the cache line contains poisoned data (operation 404). If so, the processor can suspend the thread and trigger an exception handler residing on a remaining active node (operation 406). The exception handler can then notify the spare node controller of the address of the cache line containing poisoned data (operation 408). This essentially indicates to the spare node controller that data for that cache line is not yet copied from the failing node.

In response, the spare node controller can coherently fetch the corresponding data from the failing node and write the fetched data into the local memory to replace the poisoned data (operation 410). Writing the data to the local memory clears the poisoned state. If the corresponding cache line happens to be owned by a different active node, the cache of the different active node will get snooped/read and the response sent back to the failing node, which will in turn send the response to the spare node controller. Once the poisoned data has been replaced with good data, the exception handler will return control to the suspended thread, which can now consume the correct data (operation 412). Future requests to the same memory address will now be managed by the spare node only as normal requests (operation 414). At this point, the failing node is out of the loop for this memory address, because data at this memory address has been properly migrated and is no longer poisoned. If in operation 404, the local memory is not poisoned, indicating that the data has been migrated, the request will be managed as a normal request (operation 414).

Figure 4B:
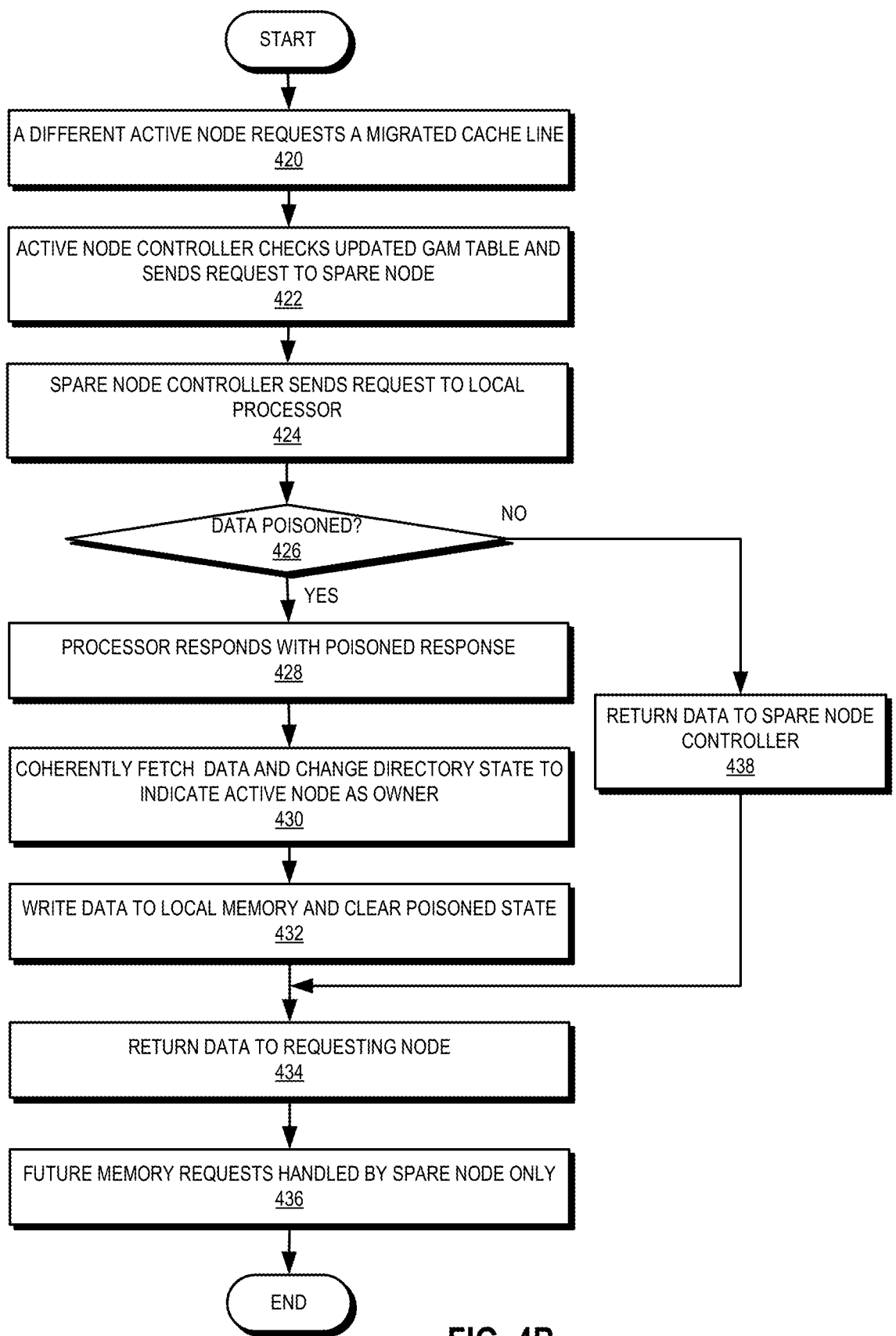
FIG. 4B presents a flowchart illustrating an exemplary process for in-service data migration, according to one aspect.

FIG. 4B presents a flowchart illustrating an exemplary process for in-service data migration, according to one aspect. During operation, a different active node may request a migrated cache line (i.e., a cache line in the failing node) (operation 420). The node controller of the active node checks its updated GAM table and sends the request to the spare node controller (operation 422). The spare node controller in turn sends the request to a corresponding local processor based on the memory address (operation 424). The local processor determines whether the memory address contains poisoned data (operation 426). If so, the local processor can respond to the request with a response indicating that the data is poisoned (operation 428). Upon receiving the poisoned response, the spare node controller can coherently fetch the corresponding data from the failing node and change the directory state of the cache line to indicate that the requesting active node is the owner of the cache line (operation 430). The spare node controller can write the data into the local memory and clear the poisoned state (operation 432). The spare node controller can return the data to the requesting active node (operation 434). Future requests to the same memory address will now be managed by the spare node only (operation 436). At this point, the failing node is out of the loop for this memory address, because data at this memory address has been properly migrated. If in operation 426, the local processor determines that the memory address is not poisoned, it returns the data to the spare node controller (operation 438). This non-poisoned response indicates to the spare node controller that the data has been migrated. In response, the spare node controller can return the data to the requesting active node (operation 434).

Figure 4C:
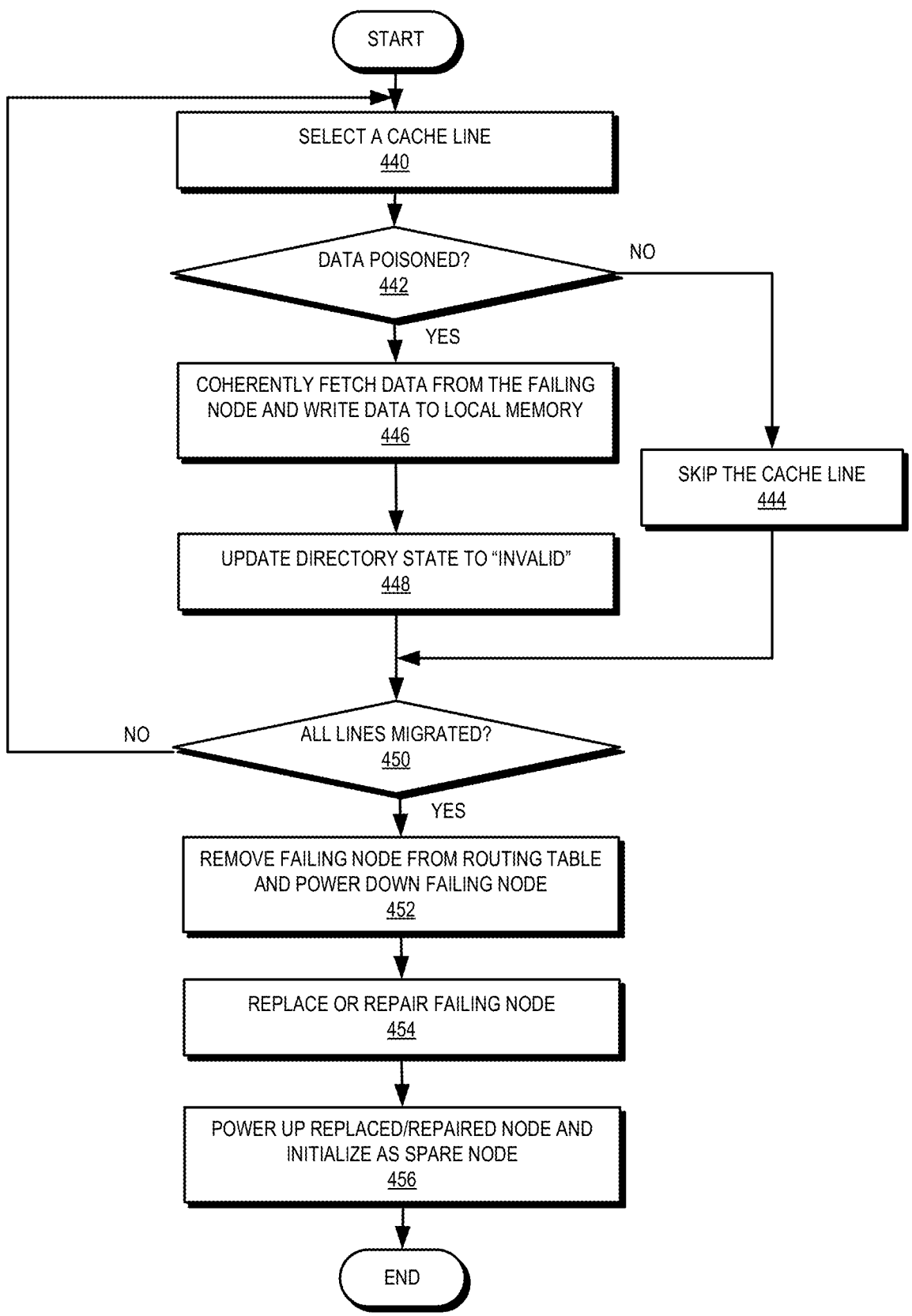
FIG. 4C presents a flowchart illustrating an exemplary process for in-service data migration, according to one aspect.

Like the previous full-directory situation, in this partial-directory situation, the spare node controller can implement a block-transfer engine to step through all local memory to facilitate data migration. FIG. 4C presents a flowchart illustrating an exemplary process for in-service data migration, according to one aspect. During operation, a block-transfer engine residing on the spare node controller can step through all cache lines in the local memory by selecting a cache line (operation 440) and determining whether the selected cache line has poisoned data (operation 442). More specifically, the block-transfer engine can coherently read the data from the selected cache line by sending a request to the corresponding processor, which responds to the request with a poisoned or not-poisoned response to the spare node controller. If the data is not poisoned, the block-transfer engine skips the cache line (operation 444). If the data is poisoned, the spare node controller can coherently fetch the corresponding data from the failing node and write the data to the local memory of the spare node (operation 446). Upon receiving the data, the directory state of the corresponding cache line in the spare node controller will be updated to "INVALID" (operation 448). At this point, the failing node is out of the loop for this particular address. Note that if there is a conflict for the same memory address because data is being migrated by a process shown in FIG. 4A or 4B, the block-transfer engine can skip the address and move to the next address.

The block-transfer engine can determine if all cache lines have been properly migrated (operation 450). If not, it moves to the next cache line (operation 440). If all cache lines have been properly migrated (either by the block-transfer engine or through the processes shown in FIGS. 4A and 4B), the failing node can be removed from all routing tables and powered down (operation 452). The failing node can be replaced or repaired (operation 454), and the replaced or repaired node can be powered on and partially initialized as the next spare node (operation 456).

Poisoning the local memory of the spare node during its initialization can ensure that local memory accesses are always managed by the spare node controller and the "POISONED" state can be used to track the migration status of each cache line. In a different implementation, instead of poisoning the local memory to force the spare node controller to take control of the memory accesses, the processors can be aware of an ongoing migration and default to the spare node controller being the owner of any cache line not found in the processors' directory. To track the migration status, the node controller can be assigned a memory space to record migration status (e.g., by setting a flag) of the blocks/pages of the local memory. Because this solution requires modifications of the processors and allocations of memory space, the activation process of the spare node can be different from the process shown in FIG. 3A.

Figure 5A:
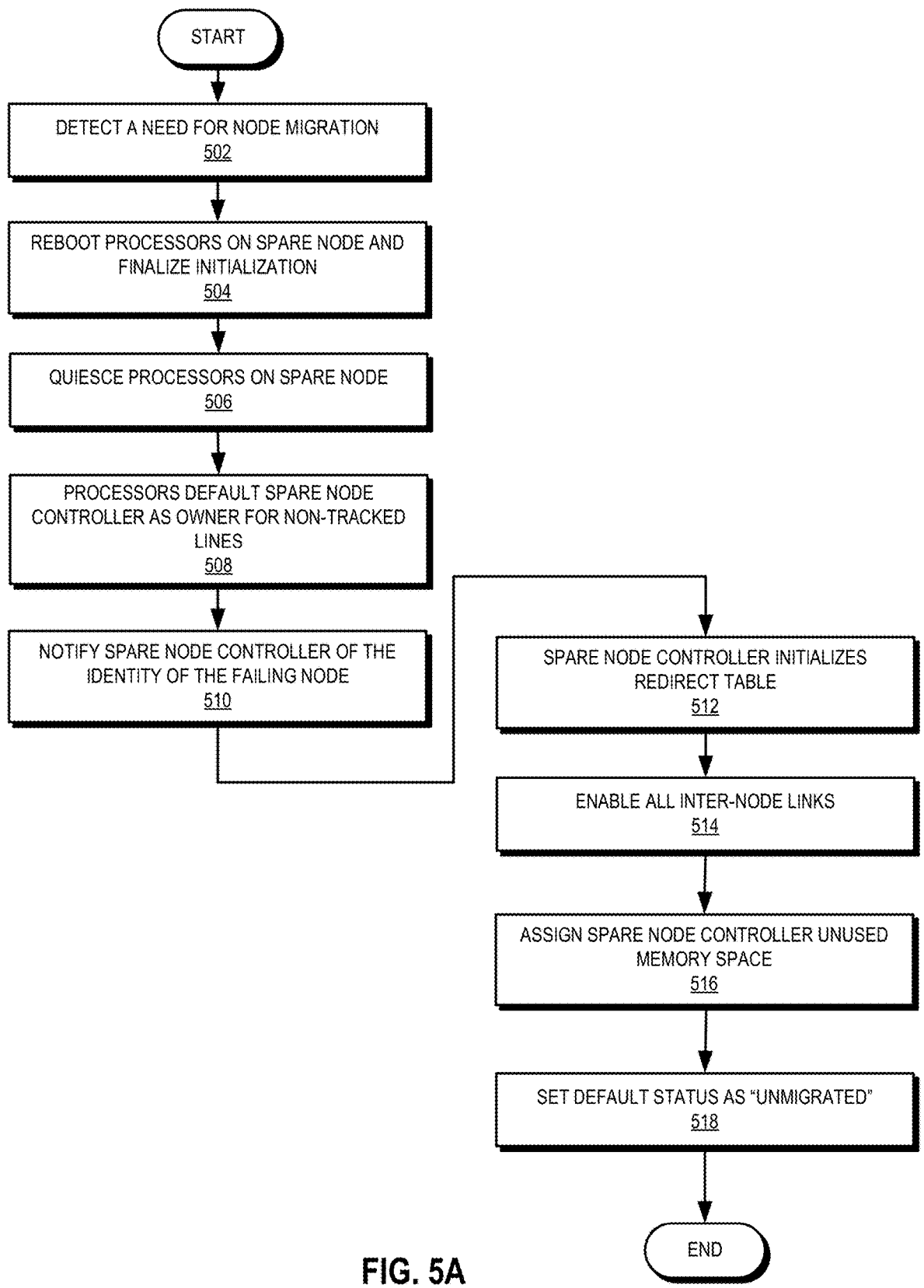
FIG. 5A presents a flowchart illustrating an exemplary process for activating a spare node, according to one aspect.

FIG. 5A presents a flowchart illustrating an exemplary process for activating the spare node, according to one aspect. During operation, the system detects a need for node migration and activates the platform-management system (operation 502). The platform-management system can subsequently reboot the processors on the spare node and finalize the initialization of the processors (operation 504). For example, the processors on the spare node can be programmed to have various parameters (e.g., SAD entries, APIC IDs, etc.) that match those of the failing node. Note that if the spare node was previously powered down, the platform-management system can power up the spare node before initializing the processors on the spare node.

Subsequently, the spare node processors are quiesced to prevent executions on the core or I/O traffic (operation 506). At this point, the processor's cache is empty, and the processor directory is not tracking any cache line owner. The processor can be configured to set the spare node controller as the default owner of any cache line not tracked in the processor's directory (operation 508). This essentially forces all initial local memory accesses to be managed by the spare node controller.

The platform-management system can notify the spare node controller of the identity of the failing node (operation 510). In response to obtaining the identity of the failing node, the spare node controller can initialize the redirect table to indicate that the remaining active nodes and the spare node are the memory homes (operation 512). The platform-management system can then enable all inter-node links (operation 514).

The spare node controller is assigned with an unused memory space (operation 516). According to some aspects, this assigned space can be attached to a local processor, a remote processor, or directly attached to the spare node controller. This assigned memory space can be used to store flags indicating whether a cache line or a page (depending on the implementation) has been migrated. One flag (which can be a binary bit) can be used for each cache line or page of the failing node. The spare node controller sets the default status of all local cache lines as "unmigrated" (operation 518). Once the spare node is initialized, states of the processors on the failing node can be migrated to the processors on the spare node using a process similar to the one shown in FIG. 3B. Upon completion of the processor states migration, data migration from the failing node to the spare node can begin. Note that using a single flag to track the cache-line migration status of a page (which can include multiple cache lines) can reduce the number of flags needed for tracking migration status of all cache lines in exchange of more complexity. When a cache line within a page is being migrated, the node controller can track all cache lines within the same page. There can be an upper bound on the number of partially migrated pages, and there is no loss of tracking precision. Once a page is successfully migrated (i.e., all cache lines in the page have been migrated), the per-page flag can be set, and the node controller can move on to another page. Note that the page size shouldn't be too large, otherwise the processor on the spare node may generate an access pattern that would force the node controller to throttle the requests. According to some aspects, each page can have two cache lines, which can reduce the amount of storage needed for the "migrated" flags by half.

Figure 5B:
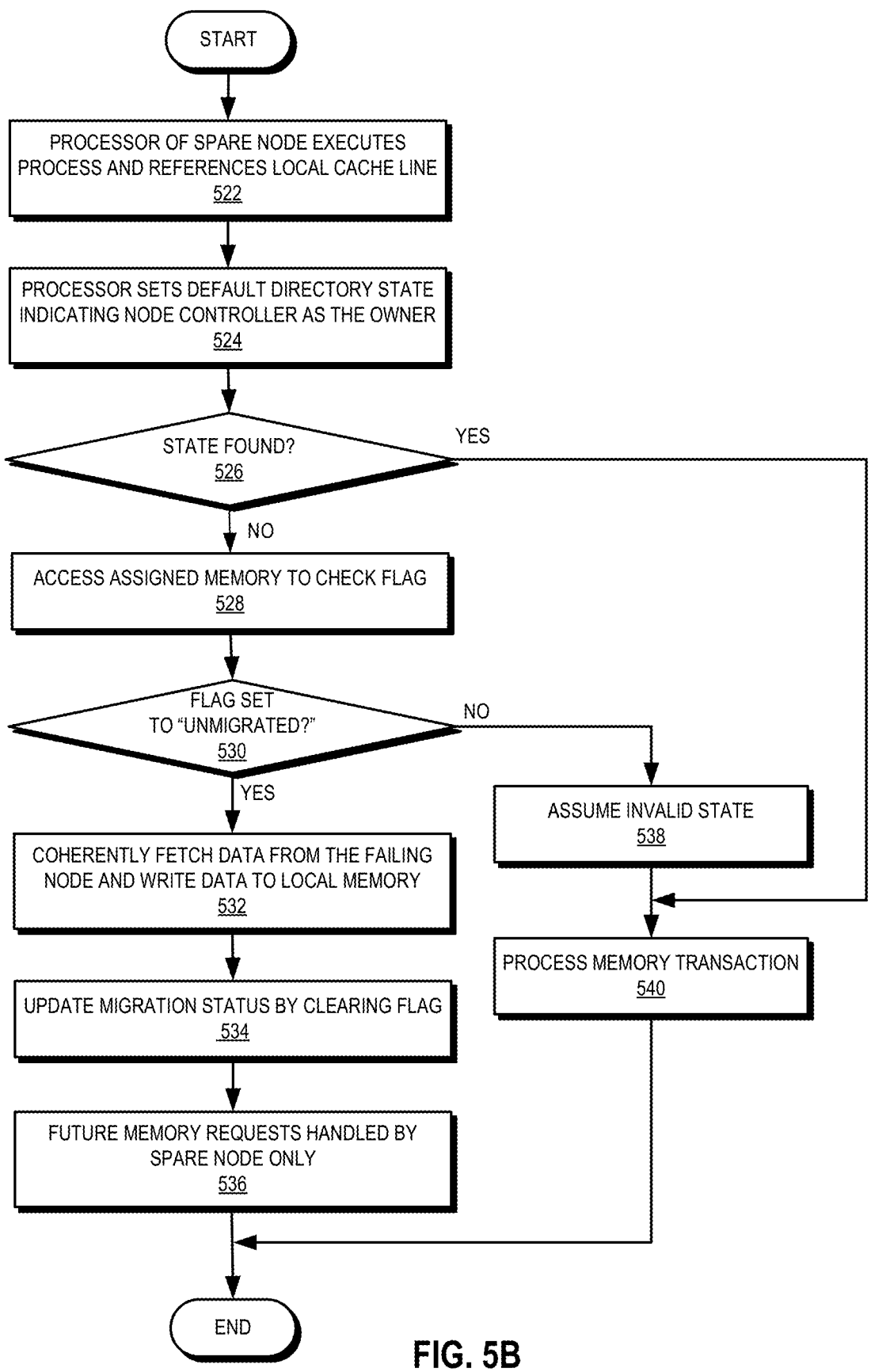
FIG. 5B presents a flowchart illustrating an exemplary process for in-service data migration, according to one aspect.

FIG. 5B presents a flowchart illustrating an exemplary process for in-service data migration, according to one aspect. During operation, a spare node processor executes a process that references a local cache line (operation 522). For example, the processor may issue a read or write request targeting the local cache line. Because local memory is not tracked in its directory, the processor sets the default directory state for the cache line indicating that the spare node controller is the owner (operation 524). The spare node controller checks its directory to determine whether a state can be found for the cache line (operation 526). If no state can be found, the spare node controller accesses the assigned memory space to check the status flag (operation 528) and determines whether the flag is set to "unmigrated," which indicates that data in the cache line has not been properly migrated (operation 530).

If the flag is set to "unmigrated," the spare node controller can coherently fetch the corresponding data from the failing node and write the data to the local memory (operation 532). If the corresponding cache line happens to be owned by a different active node, the cache of the different active node will get snooped/read and the response sent back to the failing node, which will in turn send the response to the spare node controller. Note that upon receiving the data, the spare node controller does not need to change its directory state because the data is returned to the processor. However, the spare node controller can update the migration status stored in the assigned memory space by clearing the flag to indicate that the cache line/page has been migrated (operation 534). Future requests to the same memory address(es) will now be managed by the spare node only as normal requests (operation 536). At this point, the failing node is out of the loop for the memory address(es).

If the flag is cleared, indicating that the cache line/page has been migrated, the spare node controller will assume its directory state is "INVALID" (operation 538) and will process the memory transaction according to the coherence protocol being implemented (operation 540). If in operation 526 the spare node controller finds a state, it will process the memory transaction according to the coherence protocol being implemented (operation 540).

Figure 5C:
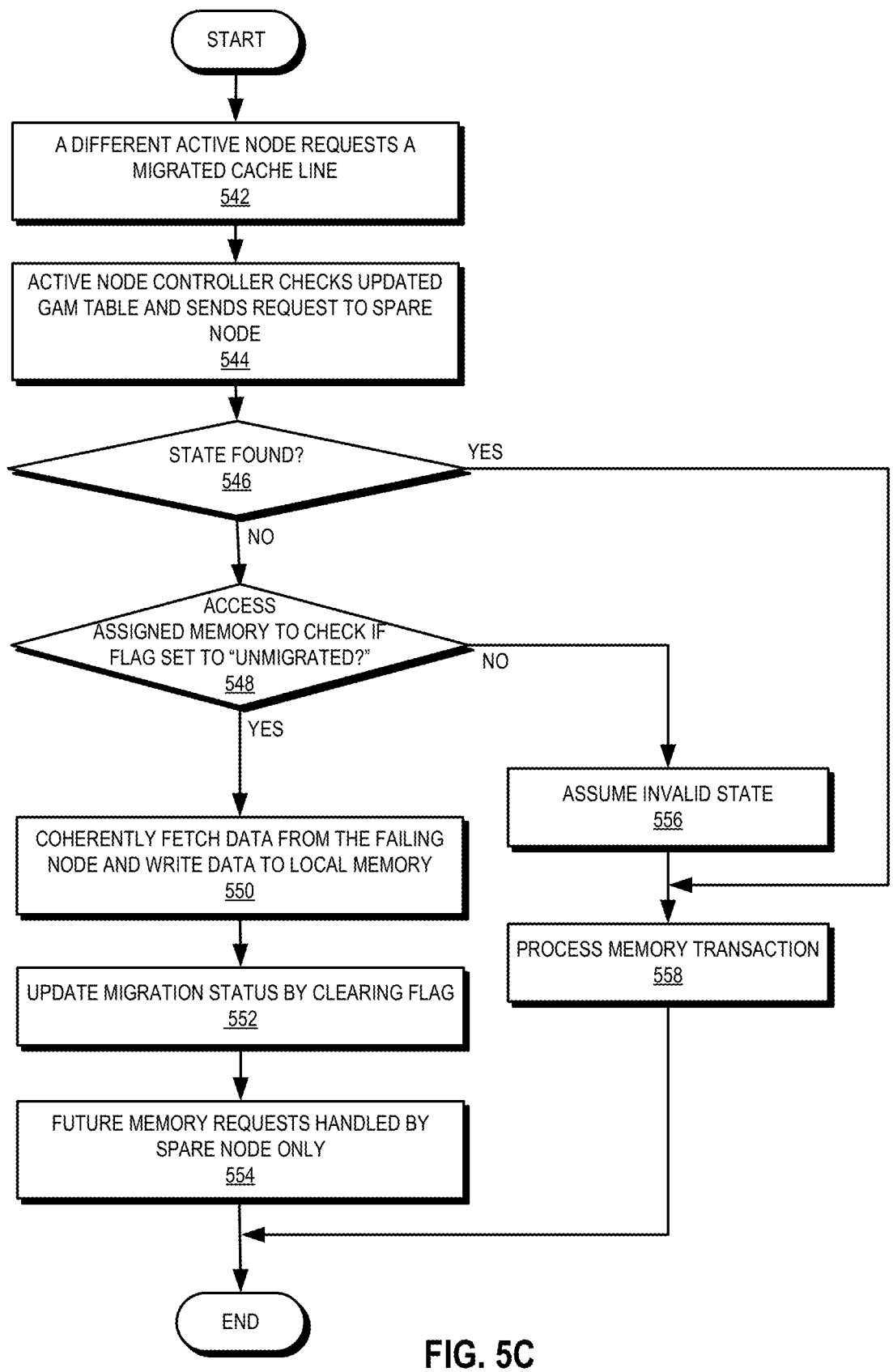
FIG. 5C presents a flowchart illustrating an exemplary process for in-service data migration, according to one aspect.

FIG. 5C presents a flowchart illustrating another exemplary process for in-service data migration, according to one aspect. During operation, a different active node may request a migrated cache line (i.e., a cache line in the failing node) (operation 542). The node controller of the active node checks its updated GAM table and sends the request to the spare node controller (operation 544). The rest of the operations can be similar to those shown in FIG. 5B. The spare node controller determines whether a state can be found in its directory for the cache line (operation 546). If no state can be found, the spare node controller checks the migration-status flag to determine whether data in the cache line has been properly migrated (operation 548).

If the flag indicates an "unmigrated" status, the spare node controller can coherently fetch the corresponding data from the failing node and write the data to the local memory (operation 550). If the corresponding cache line happens to be owned by a different active node, the cache of the different active node will get snooped/read and the response sent back to the failing node, which will in turn send the response to the spare node controller. The spare node controller does not change its directory state but will update the migration status for the cache line/page as "migrated" (operation 552). Future requests to the same memory address(es) will now be managed by the spare node only as normal requests (operation 554). At this point, the failing node is out of the loop.

If the flag indicates a migrated "status, the spare node controller will assume its directory state is "INVALID" (operation 556) and will process the memory transaction according to the coherence protocol being implemented (operation 558). If in operation 546 the spare node controller finds a state, it will process the memory transaction according to the coherence protocol being implemented (operation 558).

Figure 5D:
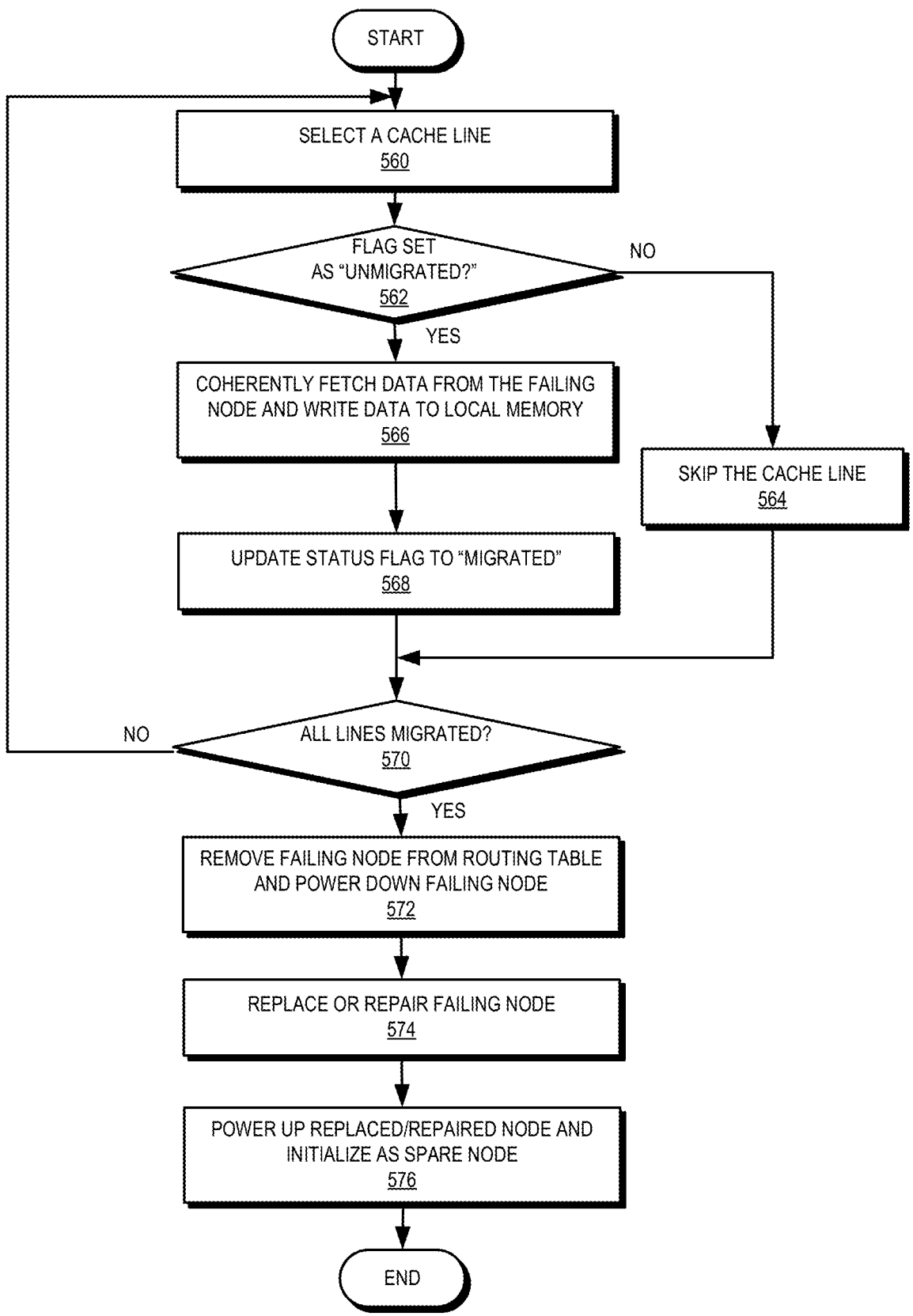
FIG. 5D presents a flowchart illustrating an exemplary process for in-service data migration, according to one aspect.

This solution for the partial-directory situation can also use a block-transfer engine to step through all local memory to facilitate data migration. FIG. 5D presents a flowchart illustrating an exemplary process for in-service data migration, according to one aspect. During operation, a block-transfer engine residing on the spare node controller can step through all cache lines in the local memory by selecting a cache line (operation 560) and determining whether the selected cache line has a migration status flag set as "unmigrated" (operation 562). If not, the cache line has been migrated and the block-transfer engine can skip the cache line (operation 564). If so, the spare node controller can coherently fetch the corresponding data from the failing node and write the data to the local memory of the spare node (operation 566). Upon receiving the data, the migration status flag will be updated to "migrated" (operation 568). At this point, the failing node is out of the loop for this particular address. Note that if there is a conflict for the same memory address because data is being migrated by a process shown in FIG. 5B or 5C, the block-transfer engine can skip the address and move to the next address.

The block-transfer engine can determine if all cache lines have been properly migrated (operation 570). If not, it moves to the next cache line (operation 560). If all cache lines have been properly migrated (either by the block-transfer engine or through the processes shown in FIGS. 5B and 5C), the failing node can be removed from all routing tables and powered down (operation 572). The failing node can be replaced or repaired (operation 574), and the replaced or repaired node can be powered on and partially initialized as the next spare node (operation 576).

To facilitate the migration of processor states and data, additional hardware features can be added to existing node controllers. The additional hardware features can be provided by adding new hardware logic blocks (e.g., logic gates, registers, memory, etc.) or by modifying existing hardware logic blocks. In addition to using hardware logics, software-assisted migration can also be possible. It is also possible to include these additional hardware features in processors to allow for migration in systems without node controllers. However, NUMA systems without node controllers are typically smaller and less likely to incur failure, and the extra equipment cost for providing redundancy may not be justified. In the case of single-processor systems, migration hardware can be an unnecessary burden since there is no spare processor available.

Figure 6:
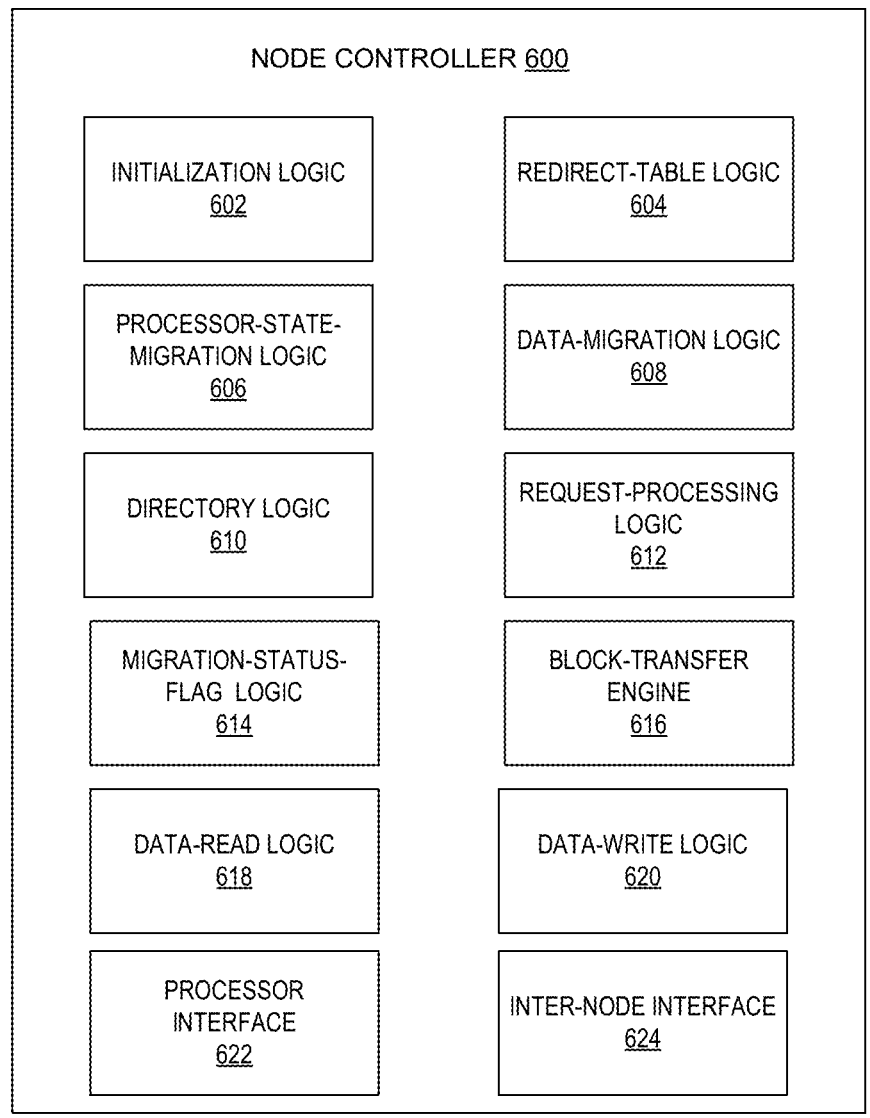
FIG. 6 presents a block diagram of an exemplary node controller, according to one aspect.

FIG. 6 presents a block diagram of an exemplary node controller, according to one aspect. Node controller 600 can include an initialization logic 602, a redirect-table logic 604, a processor-state-migration logic 606, a data-migration logic 608, a directory logic 610, a request-processing logic 612, a migration-status-flag logic 614, a block-transfer engine 616, a data-read logic 618, a data-write logic 620, a processor interface 622, and an inter-node interface 624. Depending on the actual solution being implemented, the number of components in node controller 600 can be more or fewer than what is shown in FIG. 6. The various logic units in node controller 600 can interact with each other to perform the various operations shown in FIGS. 2-5D.

Initialization logic 602 can be responsible for initializing various logic units in node controller 600 when the spare node is activated. More specifically, by initializing the various logic units, initialization logic 602 can ensure that accesses to a memory local to the spare node are always processed by the node controller. Depending on the solution being implemented, initialization logic 602 can set directory state of cache lines in the local memory, mark local memory as poisoned, or set migration-status flags (when available). Redirect-table logic 604 implements a redirect table indicating where to forward requests to remote memory. When a spare node is activated responsive to imminent failure of an active node, initialization logic 602 can update the redirect table on the spare node to indicate that the memory homes of the to-be-migrated cache lines are on the failing node.

Processor-state-migration logic 606 can be responsible for migrating the states of the processors on a failing node to processors on the spare node. It may cause processors in the entire NUMA system to quiesce to prevent conflicts. Data-migration logic 608 can be responsible for migrating data from the failing node to the spare node. Depending on the implemented solution, data-migration logic 608 can interact with different logic units in node controller 600 to facilitate proper data migration.

Directory logic 610 can implement a full directory to track the directory state of the entire local memory or a partial directory to track the directory state of a subset of cache lines in the local memory. In the full-directory implementation, in addition to conventional directory states (e.g., "MODIFIED," "OWNED," "EXCLUSIVE," "SHARED," "INVALID," etc.), directory logic 610 can track a new "ForwardPending" state, which indicates the migration status of the tracked cache line. Entries in the directory can be updated based on the migration status. For example, after a cache line has been migrated from the failing node to the spare node, the "ForwardPending" state can be cleared (e.g., the state can be changed to the "INVALID" state or to indicate that the line is owned by a requesting node controller).

Request-processing logic 612 can be responsible for processing memory requests. Depending on the implemented scheme, request-processing logic 612 may perform different actions, such as checking the directory managed by directory logic 610, sending requests to local processors, sending requests to other node controllers, etc. Migration-status-flag logic 614 can be responsible for setting and clearing migration flags (when implemented). Block-transfer engine 616 can be responsible for stepping through the local memory to migrate unmigrated and not yet requested (either by local or remote processors) cache lines, one line at a time.

Data-read logic 618 can be responsible for reading data from memory of the failing node, and data-write logic 620 can be responsible for writing data to the local memory of the spare node. Processor interface 622 is the communication interface to local processors, and inter-node interface 624 is the communication interface to other nodes.

In the examples discussed above, a spare node is included in a single system with N active nodes to provide N+1 redundancy. In practice, the solutions can be extended to a partitioned system, where a large NUMA system is divided into multiple smaller partitions for reasons like isolating jobs from each other or possibly tuning the system size to the computer job being run. In a partitioned system, a single, redundant, stand-by node can be shared between two or more partitions.

Figure 7:
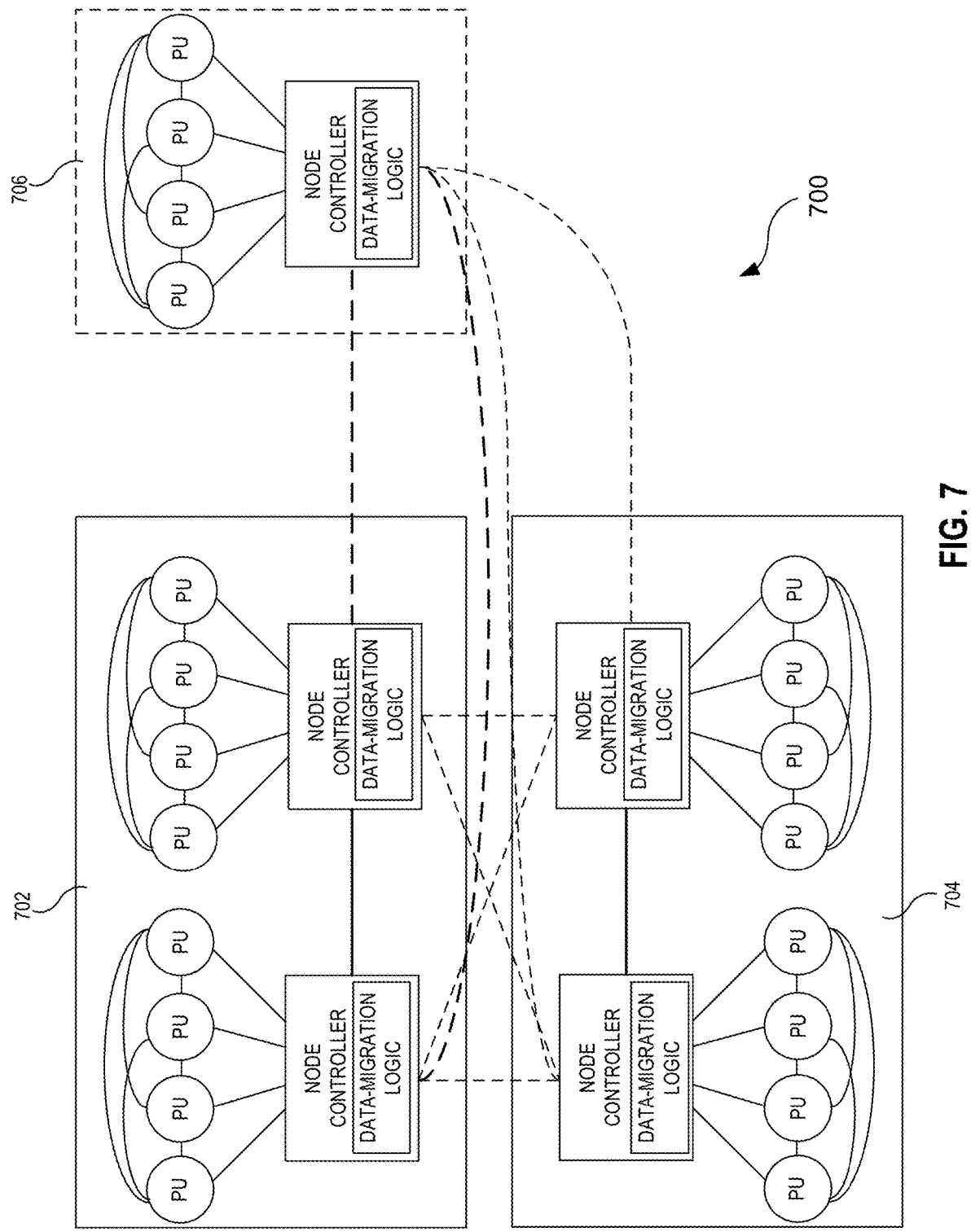
FIG. 7 illustrates an exemplary partitioned NUMA system, according to one aspect.

FIG. 7 illustrates an exemplary partitioned NUMA system, according to one aspect. Partitioned NUMA system 700 can include partitions 702 and 704, with each partition containing multiple NUMA nodes, and a spare node 706. In this example, a 5-node 20-processor system can be partitioned into two partitions, with each partition including two nodes and each node having four processors. In other words, each partition is an eight-processor system. Like the nodes shown in FIG. 1, each node in FIG. 7 can include a node controller and each node controller can include a data-migration logic for maintaining cache coherence during node migration. Spare node 706 can be on standby for both partitions, with the inter-node links between spare node 706 and other links disabled. Whenever imminent failure is detected on any node, spare node 706 can be activated to replace the failing node. Processor states and data can be migrated using one of the methods described in previous examples, depending on whether a full directory or a partial directory is implemented, or whether the processors have been modified to be aware of the on-going migration. In the example shown in FIG. 7, two partitions share one spare node. Other configurations can also be possible, such as three partitions sharing one spare node or three partitions sharing two spare nodes.

Allowing multiple partitions to share a single redundant node rather than one for each partition can provide the benefit of cost efficiency. The number of spare nodes provided in a computing system can be determined based on the probability of failure within the entire computing system rather than based on the number of partitions within the computing system. A larger number of spare nodes can be provided for systems with a higher likelihood of failure.

Figure 8:
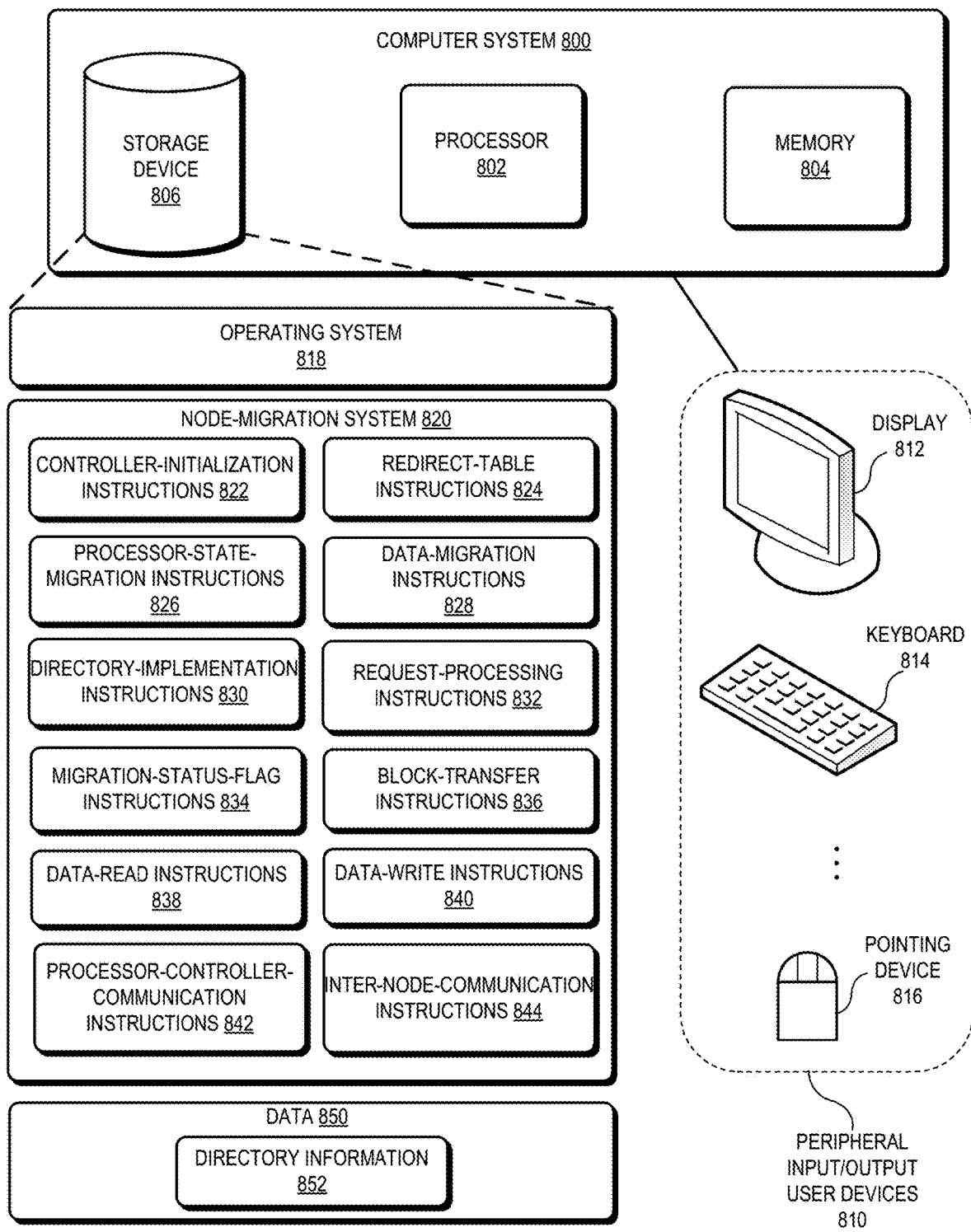
FIG. 8 illustrates an exemplary computer system that facilitates node migration, according to one aspect.

FIG. 8 illustrates an exemplary computer system that facilitates a node migration, according to one aspect of the application. Computer system 800 includes a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, a node-migration system 820, and data 850.

Node-migration system 820 can include instructions, which when executed by computer system 800, can cause computer system 800 or processor 802 to perform methods and/or processes (e.g., the various operations shown in FIGS. 2-5D) described in this disclosure. Specifically, by executing these instructions, computer system 800 can implement the various functionalities for achieving node migration while maintaining cache coherence. Node-migration system 820 can include instructions for initializing the spare node controller (controller-initialization instructions 822), instructions for implementing a redirect table (redirect-table instructions 824), instructions for migrating processor states (processor-state-migration instructions 826), instructions for migrating memory data (data-migration instructions 828), instructions for implementing a directory (directory-implementation instructions 830), instructions for processing memory requests (request-processing instructions 832), instructions for implementing migration-status flags (migration-status-flag instructions 834), instructions for implementing a block-transfer engine (block-transfer instructions 836), instructions for reading data from memory (data-read instructions 838), instructions for writing data to memory (data-write instructions 840), instructions for facilitating communications between processors and the node controller (processor-controller-communication instructions 842), and instructions for facilitating communications among node controllers (inter-node-communication instructions 844). Data 850 can include directory information 852.

The various solutions (including the full-directory solution and the two partial-directory solutions) discussed above each create a unique and fault-preventing way to track the migration status of a cache line while replacing a failing (but not yet failed) node with a spare node, thus maintaining cache coherence during data migration. Maintaining the full directory allows the spare node controller to track each possible cache line in the local memory. More specifically, the migration status of each cache line can be tracked using a newly created "ForwardPending" state. By granting the spare node controller exclusive ownership of the local memory, all memory accesses are initially managed by the spare node controller, which relies on the "ForwardPending" state to determine the migration status of a cache line. In the partial-directory situation, because the directory does not track local memory, the migration status needs to be tracked differently. In one solution, all local memory can be poisoned initially, thus forcing the spare node controller to manage data access. Once migrated, the data is no longer poisoned and can be accessed normally. In another solution, the processors can be modified to include a feature to set the node controller as the owner of cache lines not tracked in their directory. This also forces the node controller to manage all initial data accesses. The node controller can be assigned a separate, unused memory space to include tracking entries (flags) for cache lines/pages in the local memory. Once a cache line has been migrated, the flag can be changed from "unmigrated" to "migrated." In addition to performing on-demand migration of the cache lines (i.e., to migrate a cache line when it is referenced), the system can also use a block-transfer engine (which can run in the background) to step through the memory to migrate cache lines that are not yet requested.

One aspect of the application can provide a system and method for replacing a failing node with a spare node in a non-uniform memory access (NUMA) system. During operation, in response to determining that a node-migration condition is met, the system can initialize a node controller of the spare node such that accesses to a memory local to the spare node are to be processed by the node controller, quiesce the failing node and the spare node to allow state information of processors on the failing node to be migrated to processors on the spare node, and subsequent to unquiescing the failing node and the spare node, migrate data from the failing node to the spare node while maintaining cache coherence in the NUMA system and while the NUMA system remains in operation, thereby facilitating continuous execution of processes previously executed on the failing node.

In a variation on this aspect, the node controller can maintain a full directory of the local memory of the spare node. Initializing the node controller can include granting the node controller exclusive ownership of every cache line in the local memory and setting a directory state of every cache line in the local memory as a first state indicating that data in the cache line is not yet migrated from the failing node. Migrating the data can include, in response to determining that the directory state of a requested cache line is the first state, coherently fetching the cache line from the failing node and writing the fetched cache line to the local memory of the spare node.

In a further variation, the cache line is requested by a processor local to the spare node, and the system can update the directory state of the cache line to a second state indicating that the cache line is owned by the processor subsequent to writing the fetched cache line.

In a further variation, the cache line is requested by a node controller remote to the spare node, and subsequent to writing the fetched cache line, the system can update the directory state of the cache line to a third state indicating that the cache line is owned by the remote node controller.

In a variation on this aspect, the node controller can maintain a partial directory of the local memory. Initializing the node controller can include marking every cache line in the local memory as corrupted. Migrating the data can include, in response to determining that a requested cache line in the local memory of the spare node is marked as corrupted, coherently fetching the cache line from the failing node and writing the fetched cache line to the local memory of the spare node.

In a further variation, the cache line is requested by a processor local to the spare node, which triggers an exception and causes an exception handler residing on a different node in the NUMA system to notify the node controller of the spare node of an address of the corrupted cache line.

In a further variation, the cache line is requested by a node controller remote to the spare node, and the spare node controller can forward the request to a corresponding processor local to the spare node, which determines that the requested cache line is corrupted.

In a variation on this aspect, the node controller can maintain a partial directory of the local memory. Initializing the node controller can include assigning an unused memory space to the node controller to allow the node controller to track a migration status of every cache line in the local memory and setting the migration status flag of every cache line as "unmigrated."

In a further variation, migrating the data can include, in response to determining that the migration status of a requested cache line in the local memory is set as "unmigrated," coherently fetching the cache line from the failing node and writing the fetched cache line to the local memory, and setting the migration status of the written cache line as "migrated."

In a variation on this aspect, migrating data from the failing node to the spare node can include stepping through, by a block-transfer engine, the local memory to migrate unmigrated and not yet requested cache lines.

One aspect of the application can provide an apparatus for facilitating replacement of a failing node with a spare node in a non-uniform memory access (NUMA) system. The apparatus can include a node-controller-initialization logic to, in response to determining that a node-migration condition is met, initialize a node controller of the spare node such that accesses to a memory local to the spare node are to be processed by the node controller; a processor-state-migration logic configured to quiesce the failing node and the spare node to allow states of processors on the failing node to be migrated to processors on the spare node; and a data-migration logic to, subsequent to unquiescing the failing node and the spare node, migrate data from the failing node to the spare node while maintaining cache coherence in the NUMA system and while the NUMA system remains in operation, thereby facilitating continuous execution of processes previously executed on the failing node.

In a variation on this aspect, the apparatus can further include a directory for tracking directory states of cache lines in the local memory. The directory can include a full directory tracking every cache line in the local memory or a partial directory tracking a subset of cache lines in the local memory.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for replacing a failing node with a spare node in a non-uniform memory access (NUMA) system, the method comprising:
in response to determining that a node-migration condition is met, initializing a node controller of the spare node such that accesses to a memory local to the spare node are to be processed by the node controller;

quiescing the failing node and the spare node to allow state information of processors on the failing node to be migrated to processors on the spare node;

subsequent to unquiescing the failing node and the spare node, migrating data from the failing node to the spare node while maintaining cache coherence in the NUMA system and while the NUMA system remains in operation, thereby facilitating continuous execution of processes previously executed on the failing node;

maintaining, at the node controller of the spare node, a partial directory of the local memory;

wherein initializing the node controller comprises marking every cache line in the local memory as corrupted; and wherein migrating the data comprises, in response to determining that a requested cache line in the local memory of the spare node is marked as corrupted, coherently fetching the cache line from the failing node and writing the fetched cache line to the local memory of the spare node.

2. The method of claim 1, further comprising maintaining at the node controller of the spare node a full directory of the local memory of the spare node;

wherein initializing the node controller comprises granting the node controller exclusive ownership of every cache line in the local memory and setting a directory state of every cache line in the local memory as a first state indicating that data in the cache line is not yet migrated from the failing node; and wherein migrating the data comprises, in response to determining that the directory state of the requested cache line is the first state, coherently fetching the cache line from the failing node and writing the fetched cache line to the local memory of the spare node.

3. The method of claim 2, wherein the cache line is requested by a processor local to the spare node, and the method further comprises:

subsequent to writing the fetched cache line, updating the directory state of the cache line to a second state indicating that the cache line is owned by the processor.

4. The method of claim 2, wherein the cache line is requested by a node controller remote to the spare node, and wherein the method further comprises:

subsequent to writing the fetched cache line, updating the directory state of the cache line to a third state indicating that the cache line is owned by the remote node controller.

5. The method of claim 1, wherein the cache line is requested by a processor local to the spare node, which triggers an exception and causes an exception handler residing on a different node in the NUMA system to notify the node controller of the spare node of an address of the corrupted cache line.

6. The method of claim 1, wherein the cache line is requested by a node controller remote to the spare node, and wherein the method further comprises:

forwarding, by the node controller of the spare node, the request to a corresponding processor local to the spare node, which determines that the requested cache line is corrupted.

7. The method of claim 1, wherein initializing the node controller comprises assigning an unused memory space to the node controller of the spare node to allow the node controller to track a migration status of every cache line in the local memory and setting the migration status of every cache line as "unmigrated".

8. The method of claim 7, wherein migrating the data comprises:

in response to determining that the migration status of the requested cache line in the local memory is set as "unmigrated," coherently fetching the cache line from the failing node;

writing the fetched cache line to the local memory; and setting the migration status of the written cache line as "migrated".

9. The method of claim 1, wherein migrating data from the failing node to the spare node comprises using a block-transfer engine to step through the local memory to migrate unmigrated and not yet requested cache lines.

10. An apparatus for facilitating replacement of a failing node with a spare node in a non-uniform memory access (NUMA) system, the apparatus comprising:

a node-controller-initialization logic to, in response to determining that a node-migration condition is met, initialize a node controller of the spare node such that accesses to a memory local to the spare node are to be processed by the node controller;

a processor-state-migration logic to quiesce the failing node and the spare node to allow states of processors on the failing node to be migrated to processors on the spare node; and a data-migration logic to, subsequent to unquiescing the failing node and the spare node, migrate data from the failing node to the spare node while maintaining cache coherence in the NUMA system and while the NUMA system remains in operation, thereby facilitating continuous execution of processes previously executed on the failing node;

wherein the directory comprises a partial directory;

wherein the node-controller-initialization logic is to mark every cache line in the local memory of the spare node as corrupted; and wherein the data-migration logic is to coherently fetch the cache line from the failing node in response to determining that a requested cache line in the local memory of the spare node is marked as corrupted and write the fetched cache line to the local memory of the spare node.

11. The apparatus of claim 10, further comprising a directory for tracking directory states of cache lines in the local memory of the spare node, wherein the directory comprises the partial directory tracking a subset of cache lines in the local memory.

12. The apparatus of claim 11, wherein the directory comprises a full directory;

wherein the node-controller-initialization logic is to grant the node controller of the spare node exclusive ownership of every cache line in the local memory of the spare node and set a directory state of every cache line as a first state indicating that data in the cache line is not yet migrated from the failing node; and wherein the data-migration logic is to coherently fetch the cache line from the failing node in response to determining that the directory state of the requested cache line is the first state and write the fetched cache line to the local memory of the spare node.

13. The apparatus of claim 12, wherein the cache line is requested by a processor local to the spare node, and wherein the data-migration logic is to:

subsequent to writing the fetched cache line, update the directory state of the cache line to a second state indicating that the cache line is owned by the processor.

14. The apparatus of claim 12, wherein the cache line is requested by a node controller remote to the spare node, and wherein the data-migration logic is to:
subsequent to writing the fetched cache line, update the directory state of the cache line to a third state indicating that the cache line is owned by the remote node controller.

15. The apparatus of claim 10, wherein the cache line is requested by a processor local to the spare node, which triggers an exception and causes an exception handler residing on a different node in the NUMA system to notify the node controller of the spare node of an address of the corrupted cache line.

16. The apparatus of claim 10, wherein the cache line is requested by a node controller remote to the spare node, and wherein the node controller of the spare node is to forward the request to a corresponding processor local to the spare node, which determines that the requested cache line is corrupted.

17. The apparatus of claim 10,
wherein the node-controller-initialization logic is to assign an unused memory space to the node controller of the spare node to allow the node controller to track a migration status of every cache line in the local memory of the spare node and set the migration status of every cache line as "unmigrated;" and
wherein the data-migration logic is to:
in response to determining that the migration status of the requested cache line in the local memory is set as "unmigrated," coherently fetch the cache line from the failing node;
write the fetched cache line to the local memory; and
set the migration status of the written cache line as "migrated".

18. The apparatus of claim 10, further comprising a block-transfer engine to step through the local memory to migrate unmigrated and not yet requested cache lines.

* * * * *